April 26, 1966 L. U. C. KELLING 3,248,622
POSITION CONTROL SYSTEM UTILIZING A COARSE
ANALOG COMPARISON SYSTEM WITH A
FINE DISCRIMINATION SYSTEM
Filed Sept. 5, 1961 13 Sheets-Sheet 1

INVENTOR:
LEROY U.C. KELLING,
BY James G. Williams
HIS ATTORNEY.

April 26, 1966  L. U. C. KELLING  3,248,622
POSITION CONTROL SYSTEM UTILIZING A COARSE
ANALOG COMPARISON SYSTEM WITH A
FINE DISCRIMINATION SYSTEM
Filed Sept. 5, 1961  13 Sheets-Sheet 2

INVENTOR:
LEROY U.C. KELLING,

BY James J. Williams
HIS ATTORNEY.

April 26, 1966 L. U. C. KELLING 3,248,622
POSITION CONTROL SYSTEM UTILIZING A COARSE
ANALOG COMPARISON SYSTEM WITH A
FINE DISCRIMINATION SYSTEM
Filed Sept. 5, 1961 13 Sheets-Sheet 3

INVENTOR:
LEROY U. C. KELLING,

BY *James G. Williams*
HIS ATTORNEY.

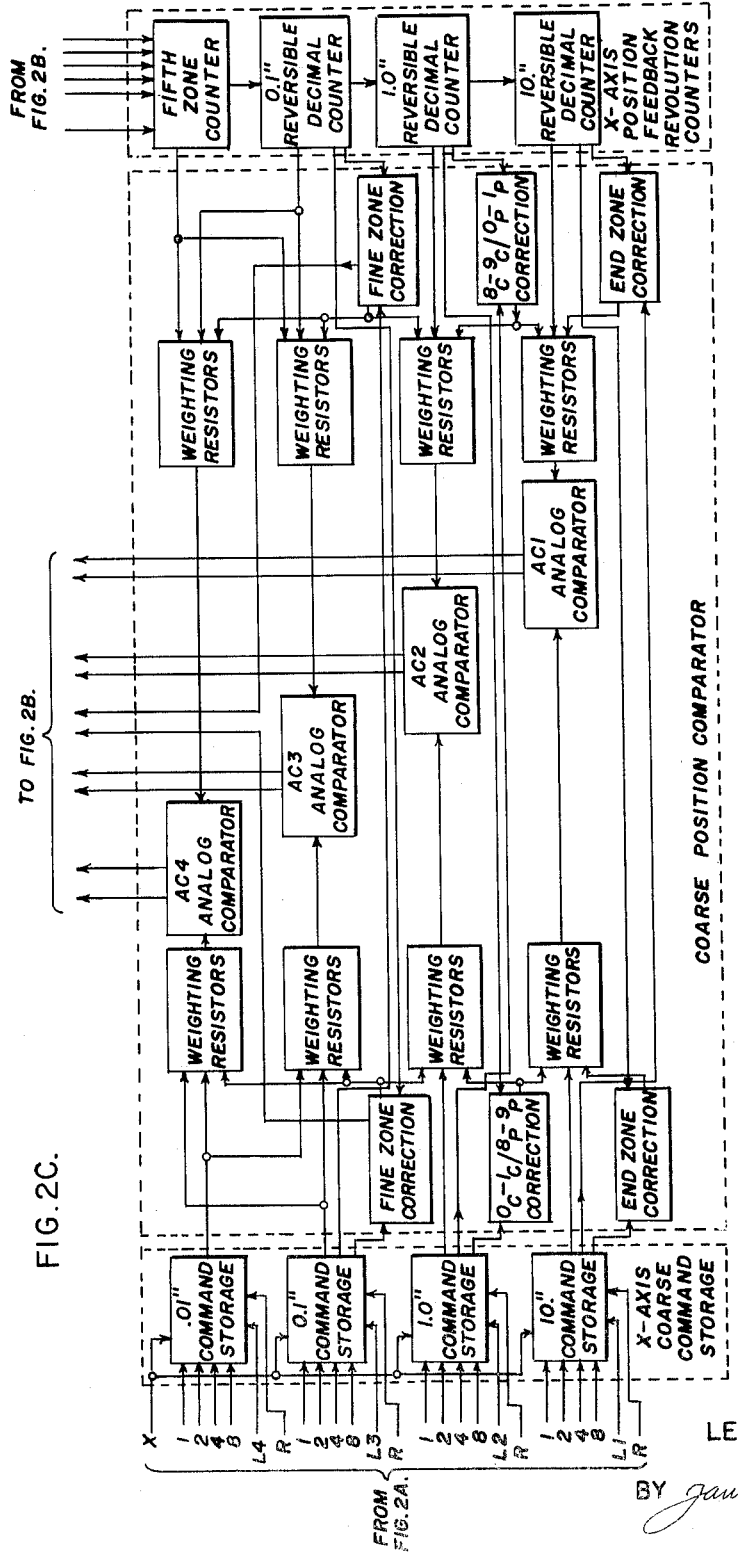

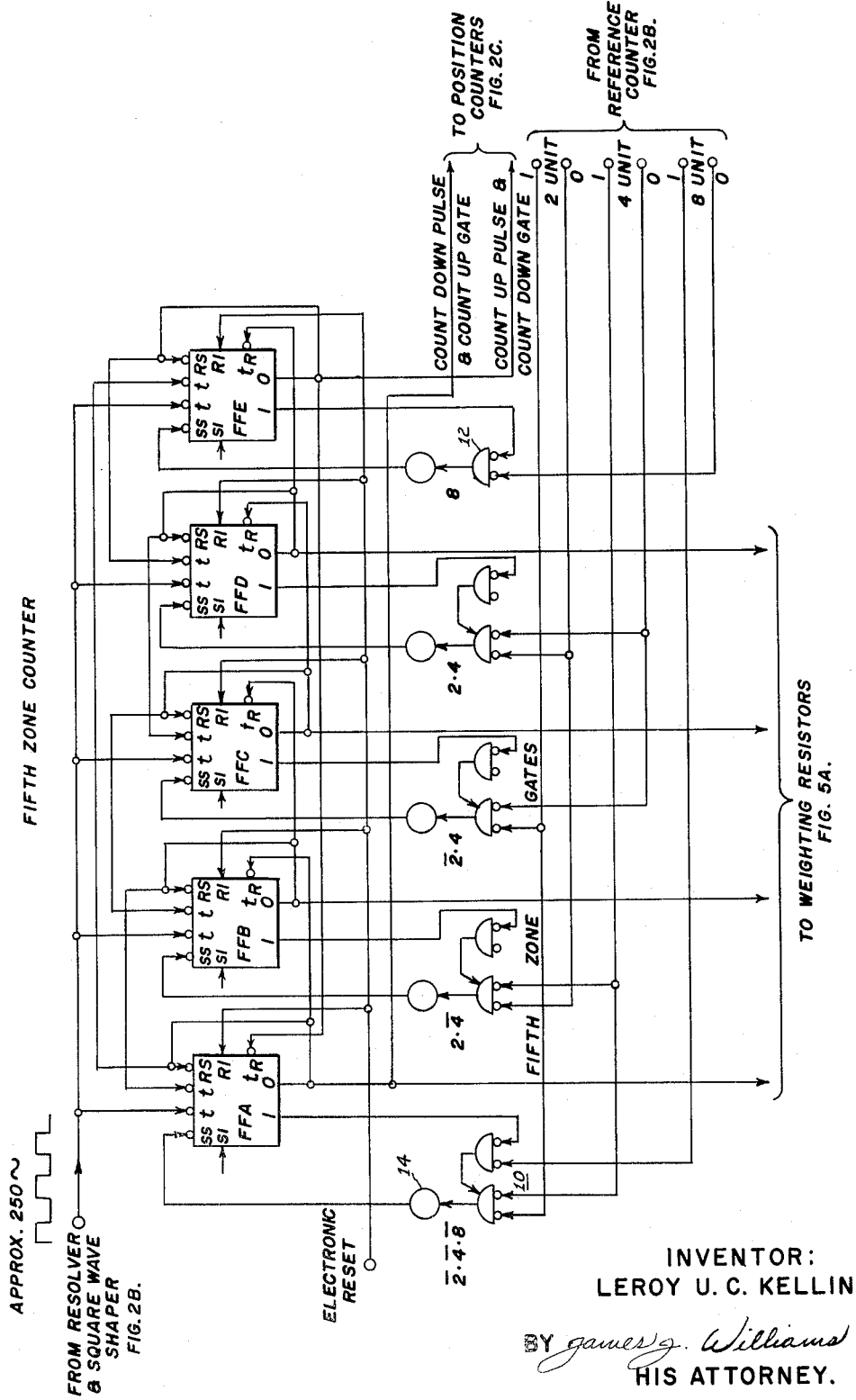

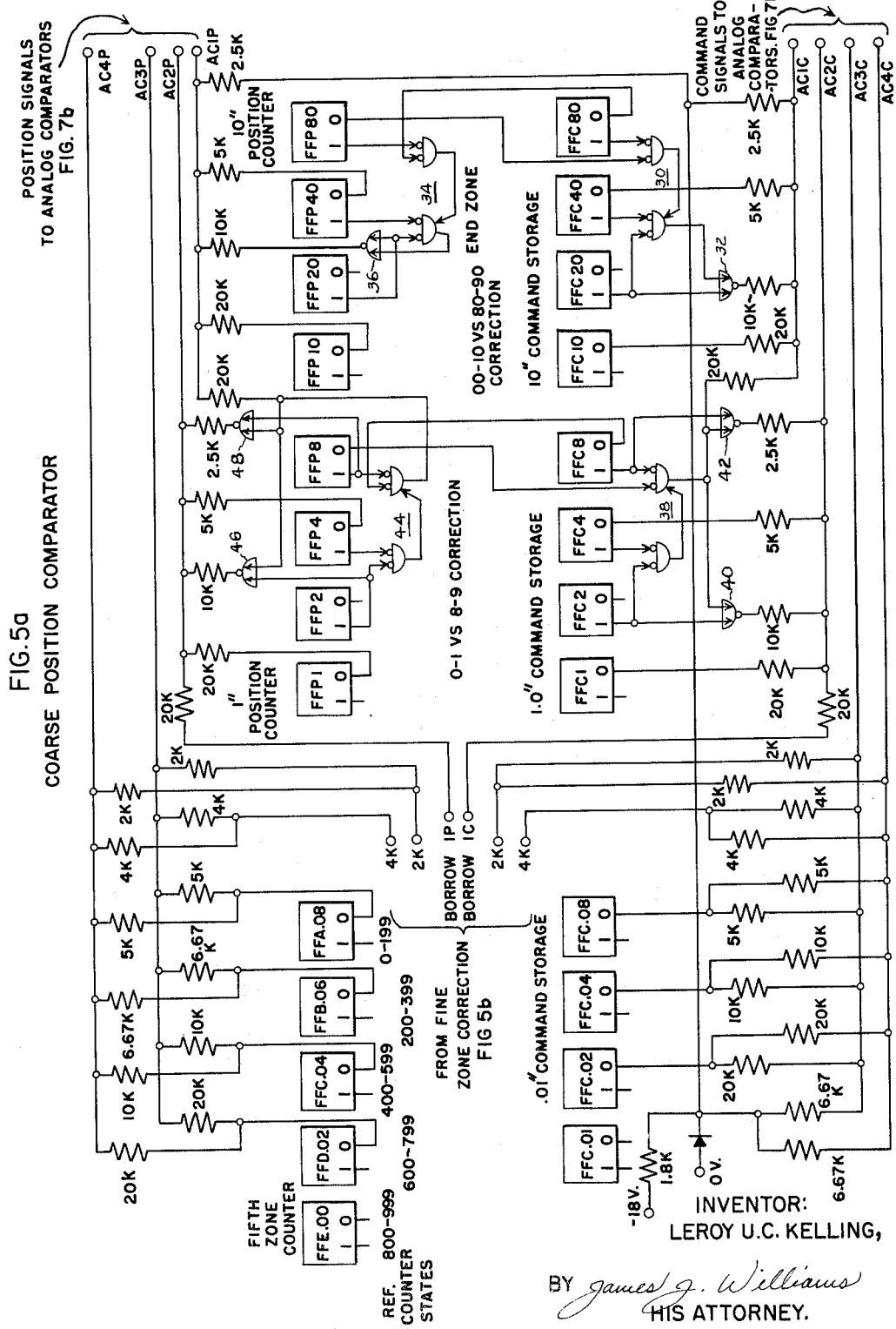

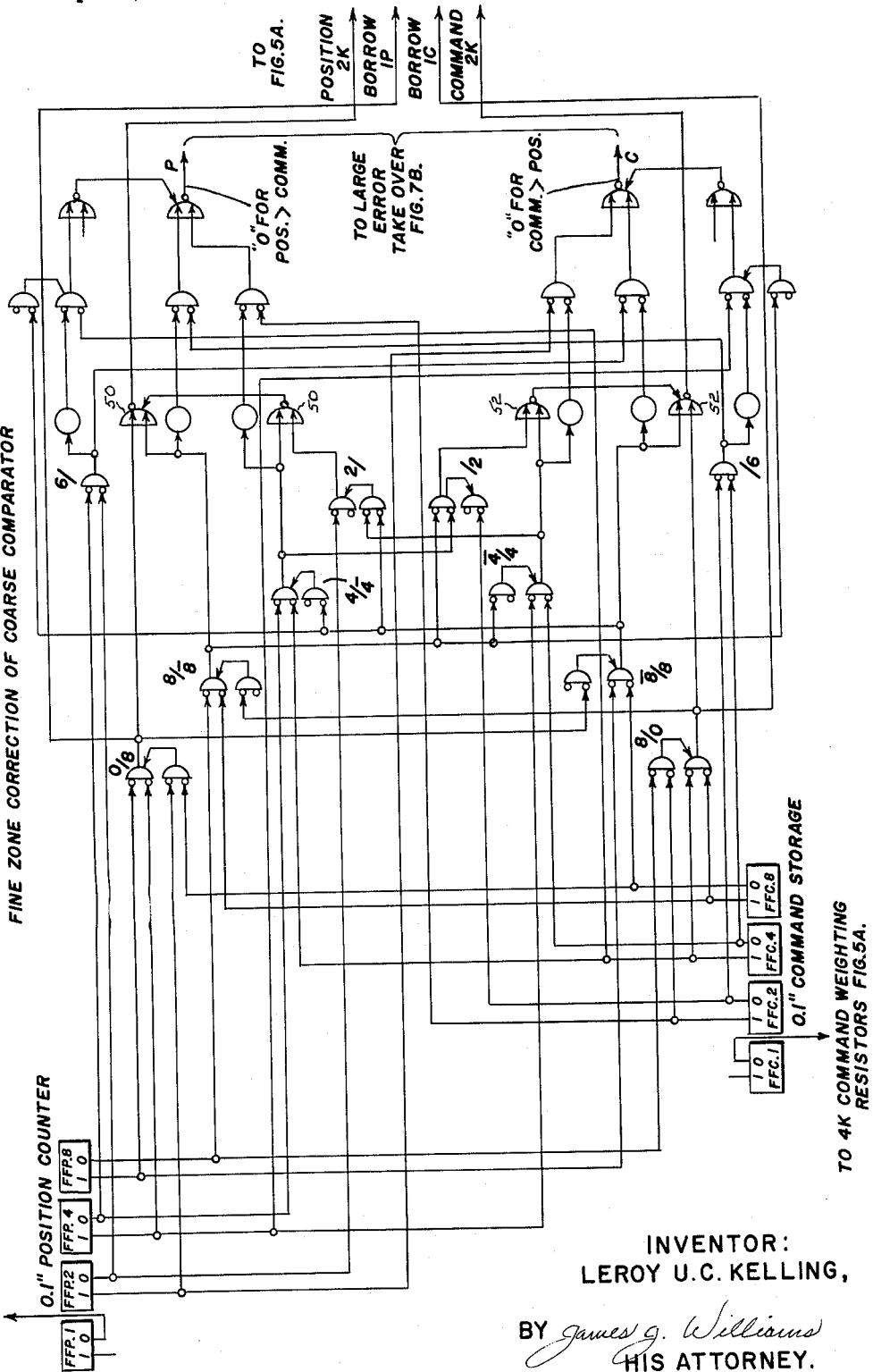

April 26, 1966  L. U. C. KELLING  3,248,622
POSITION CONTROL SYSTEM UTILIZING A COARSE
ANALOG COMPARISON SYSTEM WITH A
FINE DISCRIMINATION SYSTEM
Filed Sept. 5, 1961  13 Sheets-Sheet 8
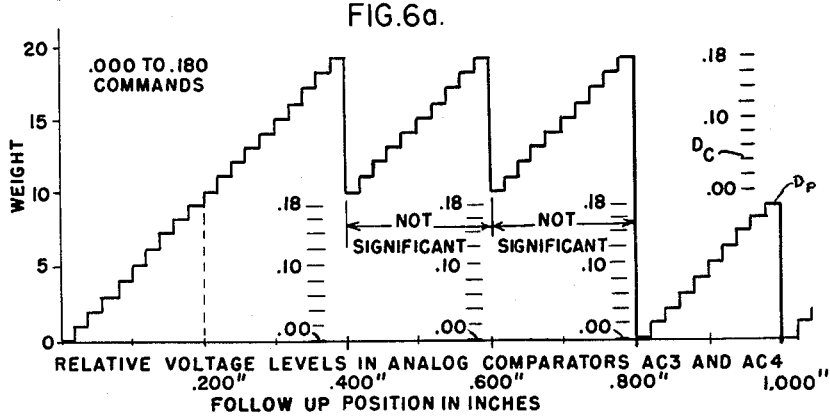
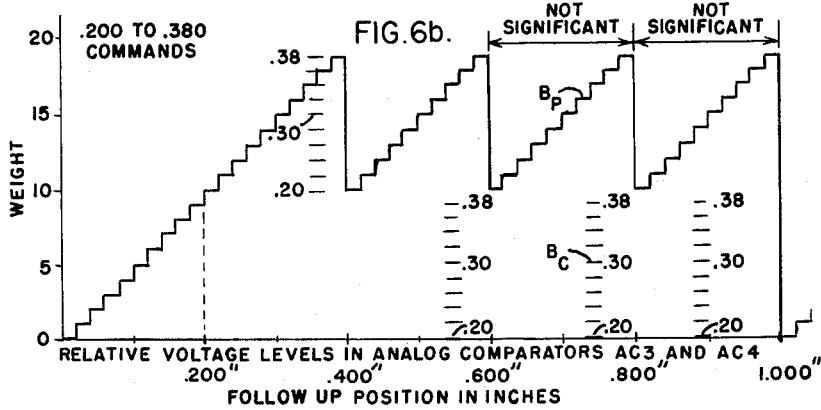
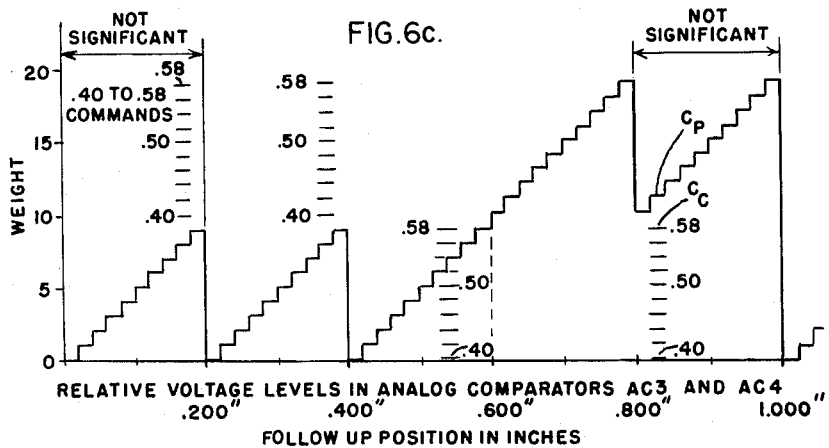
INVENTOR:
LEROY U.C. KELLING,
BY *james g. Williams*
HIS ATTORNEY.

April 26, 1966
L. U. C. KELLING
3,248,622
POSITION CONTROL SYSTEM UTILIZING A COARSE
ANALOG COMPARISON SYSTEM WITH A
FINE DISCRIMINATION SYSTEM
Filed Sept. 5, 1961
13 Sheets-Sheet 9

INVENTOR:
LEROY U.C. KELLING,

BY James J. Williams
HIS ATTORNEY.

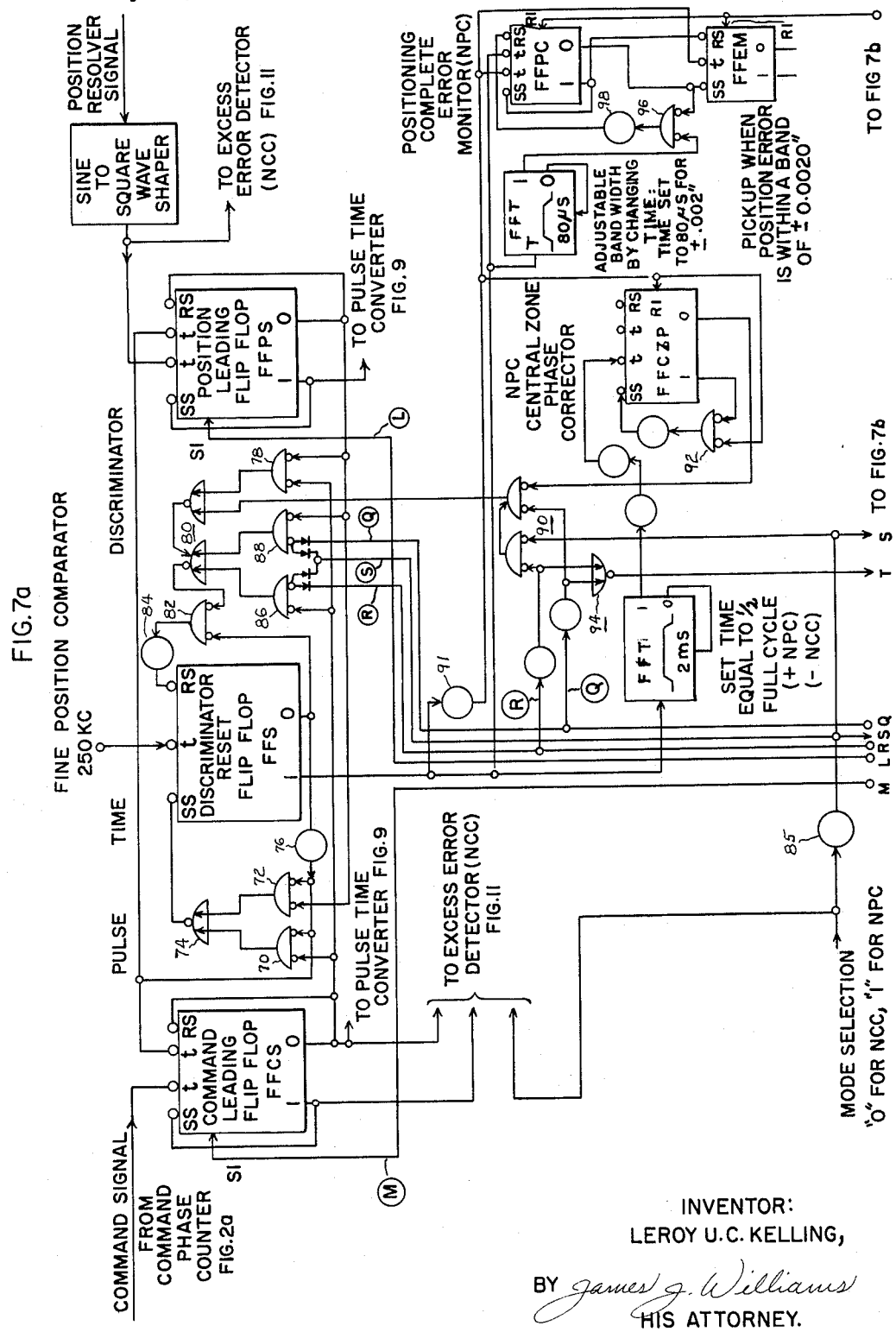

April 26, 1966 L. U. C. KELLING 3,248,622
POSITION CONTROL SYSTEM UTILIZING A COARSE
ANALOG COMPARISON SYSTEM WITH A
FINE DISCRIMINATION SYSTEM
Filed Sept. 5, 1961 13 Sheets-Sheet 12
FIG.9 PULSE TIME TO CURRENT CONVERTER
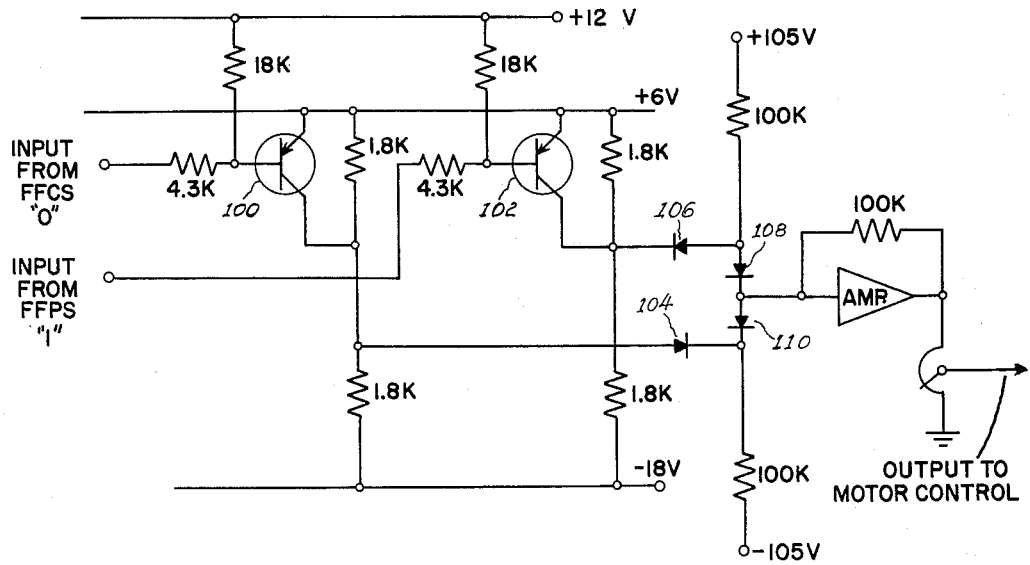
FIG.8
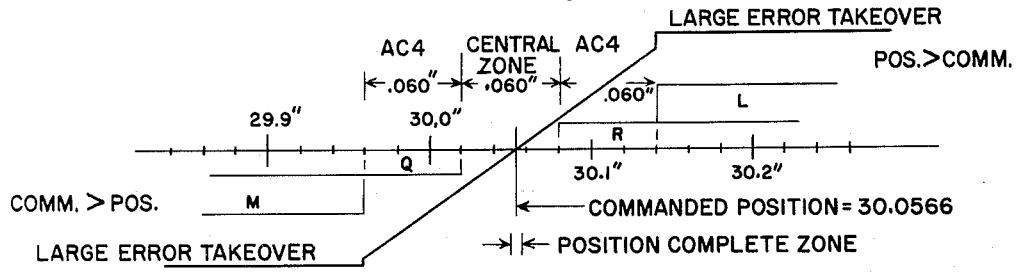
FIG.10
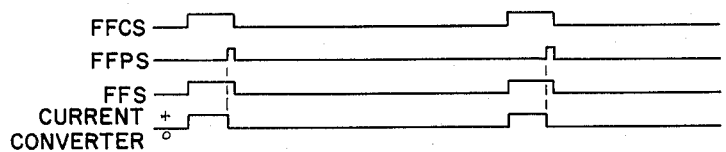
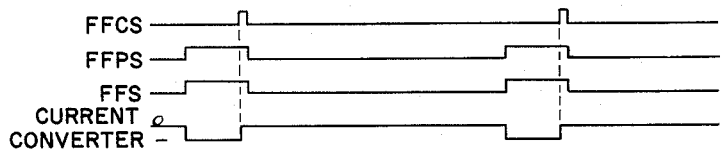
INVENTOR:
LEROY U.C KELLING,
BY James J. Williams
HIS ATTORNEY.

April 26, 1966     L. U. C. KELLING     3,248,622
POSITION CONTROL SYSTEM UTILIZING A COARSE
ANALOG COMPARISON SYSTEM WITH A
FINE DISCRIMINATION SYSTEM Filed Sept. 5, 1961     13 Sheets-Sheet 13

INVENTOR:
LEROY U.C. KELLING,

BY *James G. Williams*
    HIS ATTORNEY.

United States Patent Office 3,248,622
Patented Apr. 26, 1966

3,248,622
POSITION CONTROL SYSTEM UTILIZING A COARSE ANALOG COMPARISON SYSTEM WITH A FINE DISCRIMINATION SYSTEM
Leroy U. C. Kelling, Waynesboro, Va., assignor to General Electric Company, a corporation of New York
Filed Sept. 5, 1961, Ser. No. 136,049
20 Claims. (Cl. 318—28)

My invention relates to a position control system, and particularly to a position control system which utilizes digital and static techniques.

In the machine tool industry, there is an increasing demand for automatic controls. Generally, such controls may perform a large number of functions such as causing a machine tool to move to a designated location in one or more dimensions or such as causing a machine tool to move along a designated path in one or more dimensions. The first function is commonly called position control and the second function is commonly called contour control. Although my invention relates primarily to position control as opposed to contour control, some of the features to be described hereafter may be applied to contour control as well.

Accordingly, an object of my invention is to provide an improved position control system.

Also in the machine tool industry, there is an increasing demand for automation controls which can control the position of a machine tool quickly, accurately, and reliably. Therefore, another object of my invention is to provide an improved position control system which controls position quickly, accurately, and reliably.

Further, and in view of these demands, another object of my invention is to provide an improved position control system which, in certain aspects, utilizes both digital and analog techniques to an improved advantage.

Another object of my invention is to provide a position control system which has improved reliability.

Another object of my invention is to provide a position control system which uses static devices to an improved advantage.

Another object of my invention is to utilize less moving parts and more static devices to provide a position control system having improved reliability.

Generally, I utilize static techniques in my invention since such techniques are inherently faster, more accurate, and more reliable. Such techniques include digital logic which performs functions previously performed by mechanical and dynamic devices. Thus digital logic, in the form of corresponding information groups of varying significance, is used in my position control system to indicate the actual position of an object or machine tool and to indicate the commanded position of the object or tool. However, in accordance with my invention, my position control system utilizes a relatively coarse position comparator system in which an analog comparison is made between numbers representing the actual position of the object or tool and the commanded position of the object or tool in such a manner as to sense the approach of the two numbers in spite of rather significant differences between the two numbers on a digit by digit comparison. Therefore my coarse position comparator system includes a plurality of digital-to-analog converters. One of these converters is respectively coupled to each of the actual position groups and to each of the commanded position groups to provide an analog indication of each of the groups of varying significance. Each of the corresponding actual position and commanded position groups are respectively compared in a coarse analog comparator which provides a digital output having a value determined by the relative magnitudes of the actual position and the commanded position. Thus, the coarse comparison is made in an analog system but with digital inputs and outputs. The digital outputs from the coarse analog comparators are utilized in a relatively fine position comparator system also in accordance with my invention. The fine position comparator system includes a command storage element and a position storage element. Each of these storage elements has at least two stable conditions which can be controlled by inputs thereto. For coarse positioning, either the command storage element or the position storage element is held in a first condition in response to the outputs from the coarse analog comparators, and positioning means responsive to this first condition provides the desired positioning. However, when the desired positioning is within some predetermined range, the coarse comparison stops and the fine comparison takes over. The fine position comparator compares a phase analog signal representative of the less significant digits of the commanded position with another phase analog signal derived from a position feedback device representing the fine position. These position and command signals are respectively applied to the position and command storage elements to cause the storage elements to respectively assume the first condition. These first conditions will be assumed at different times which indicate the relative phase of the position and command signals. As mentioned, the positioning means are responsive to the storage elements assuming this first condition so that fine positioning is accomplished in the interval between the time one storage element assumes the first condition and the time the other storage element assumes the first condition. In addition to these features, my invention provides correction circuits in the coarse comparison system for enabling the control to bring about a position of 00.0000 inch and for preventing the control from operating incorrectly when commanded positions and actual positions are very close. My fine positioning system includes correction circuits which insure that the command signals and the position signals are examined or utilized in the correct order or sequence to prevent incorrect operation.

The subject matter which I regard as my invention is particularly pointed out and distinctly claimed in the concluding portion of this specification. My invention, its structure, its operation, and further objects and advantages thereof, may be better understood by reference to the following description taken in connection with the accompanying drawing in which:

FIGURE 1 shows a relatively simple block diagram of my position control system;

FIGURES 2a, b, and c show a relatively complete block diagram of my position control system;

FIGURE 4 shows a zone counting device of my position feedback revolution counter;

Figure 11:
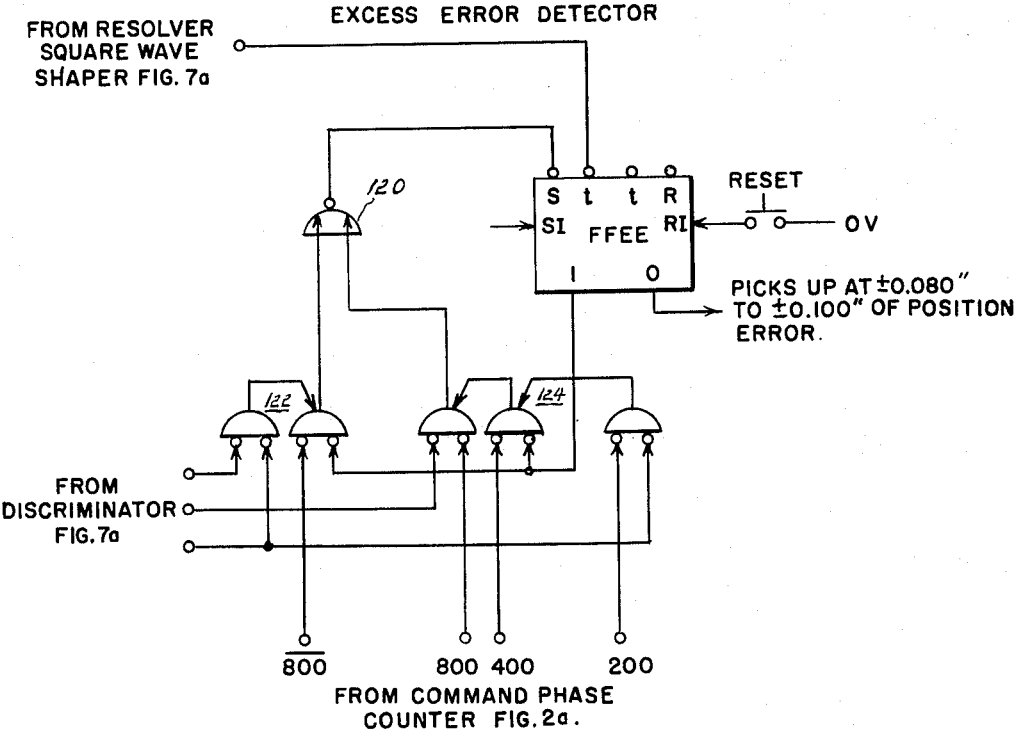
Figure 12:
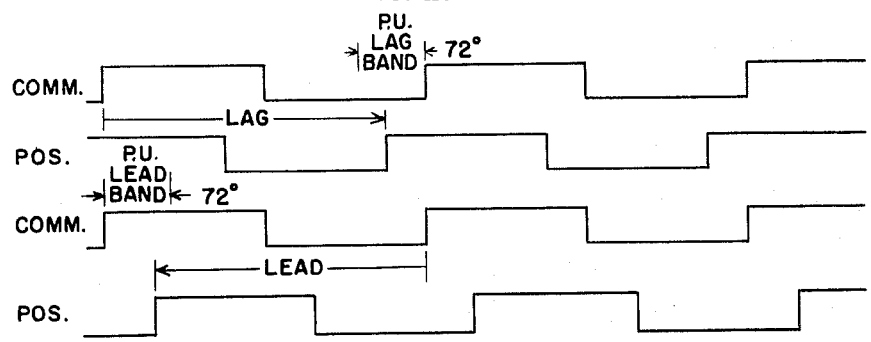

FIGURES 5a and b show substantially complete diagrams of my coarse position comparator system;

FIGURES 6a, b, c, d, and e show waveforms illustrating the operation of my coarse position comparator system;

FIGURES 7a and b show substantially complete diagrams of my fine position comparator system;

FIGURE 8 shows a waveform illustrating one operation of positioning in my position control system;

FIGURE 9 shows an example of a converter circuit which may be used with my fine position comparator system;

FIGURE 10 shows waveforms illustrating the operation of my fine position comparator system and converter circuit;

FIGURE 11 shows an excess error detector detector which may be used with my fine position comparator system in a contour control; and FIGURE 12 shows waveforms illustrating the operation of my excess error detector.

In the following specification, I will first give a brief description of a position control system which utilizes my invention. Then, I will give a rather comprehensive description of the same position control system with some emphasis on my invention. Then I will give a detailed description of each of the subsystems in the position control system with particular emphasis on those subsystems forming part of my invention.

*Brief description of my position control system*

Figure 1:
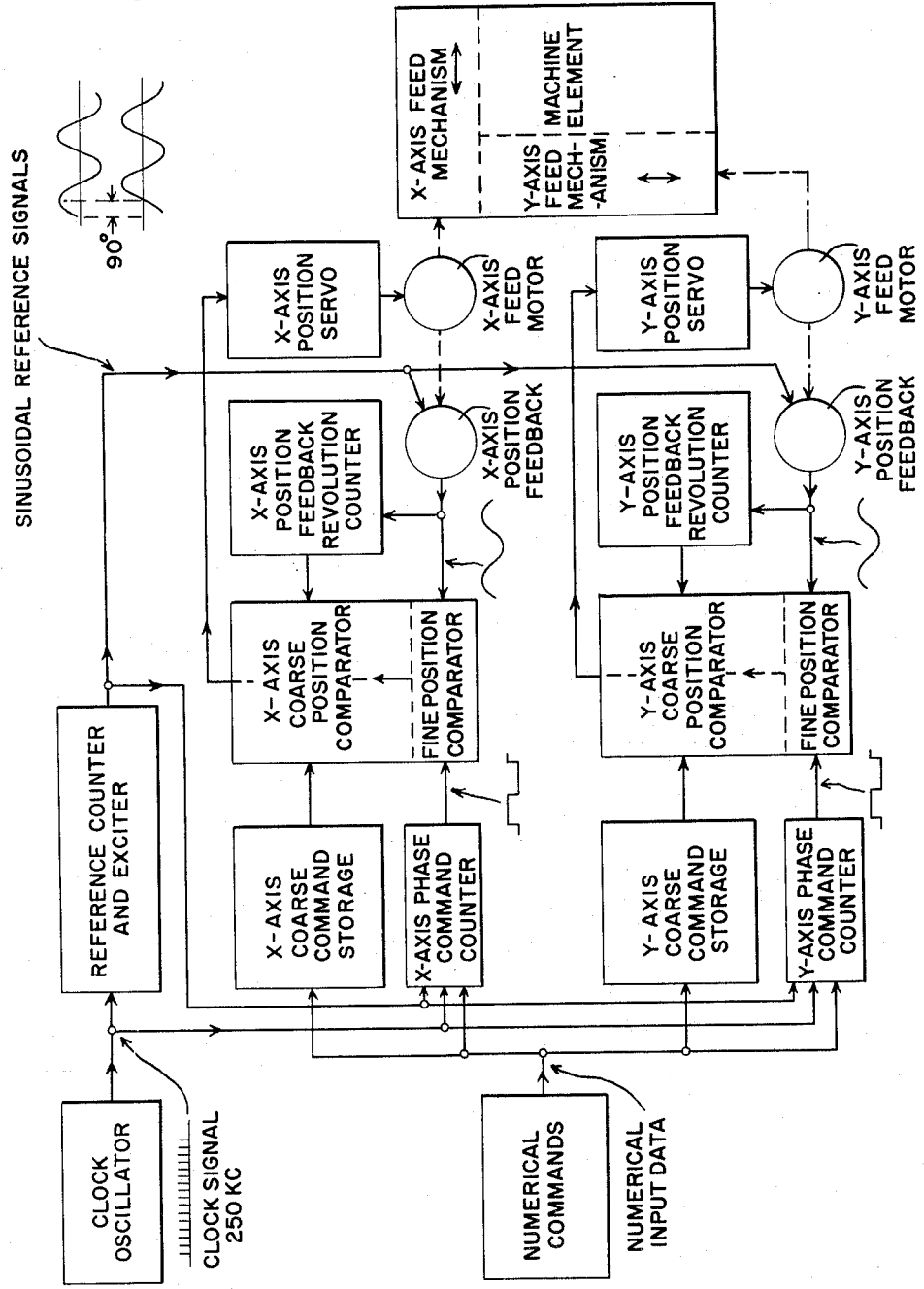

In FIGURE 1, I have shown, in block diagram form, a position control system which utilizes my invention. At the outset, it should be noted that the system in which I contemplate using my invention is a position control system for positioning objects at a specified point in one or more dimensions in response to numerical commands. This specified point may be referenced to some arbitrary reference point. In the case of a two-dimensional position control system, the reference points would be the zero points in X and Y coordinates. Commands for the position control system are provided in numerical form from some suitable medium such as punched tape or cards. These commands are supplied to the X axis and the Y axis coarse command storage elements. The more significant or the coarse portions of the command are supplied to the coarse command storage elements while the less significant or finer commands are supplied to command phase counters for the appropriate X and Y axes. An oscillator having a basic frequency, for example 250 kilocycles, is provided to supply fixed frequency signals to the position control system. These signals are applied to a reference counter and exciter which, in effect, divides the frequency (by 1000 for example) and provides sinusoidal signals of some lower frequency, in the same example 250 cycles. These sinusoidal signals have a relative phase of 90 degrees with respect to each other for use in the excitation of the position feedback devices. The oscillator signals and the reference counter signals are also supplied to the command phase counters for the X and Y axes. A coarse position comparator system and a fine position comparator system are provided for both the X and Y axes. The coarse position comparator makes an analog comparison of the more significant digits of the numerical command numbers with the corresponding digits of a number representing the coarse position of the object to provide relatively coarse positioning through an appropriate position servo and feed motor which drives the machine element and position feedback device toward the command position. The feed motors drive their respective position feedback devices and machine element or elements. The position feedback devices are mechanically coupled to their respective feed motors as indicated by the dashed lines. These position feedback devices may be typical resolvers which are known in the art. When such a resolver is excited by two sinusoidal signals having a 90 degree phase relationship, they can provide a single output signal having a phase, with respect to some reference, which varies in response to and hence is indicative of its rotational position relative to a reference position. Likewise, the fine position comparator system provides relatively fine positioning through the same position servo and feed motor in response to a phase comparison of signals from the command phase counter and the position feedback device.

*Comprehensive description of my position control system*

Figure 2A:
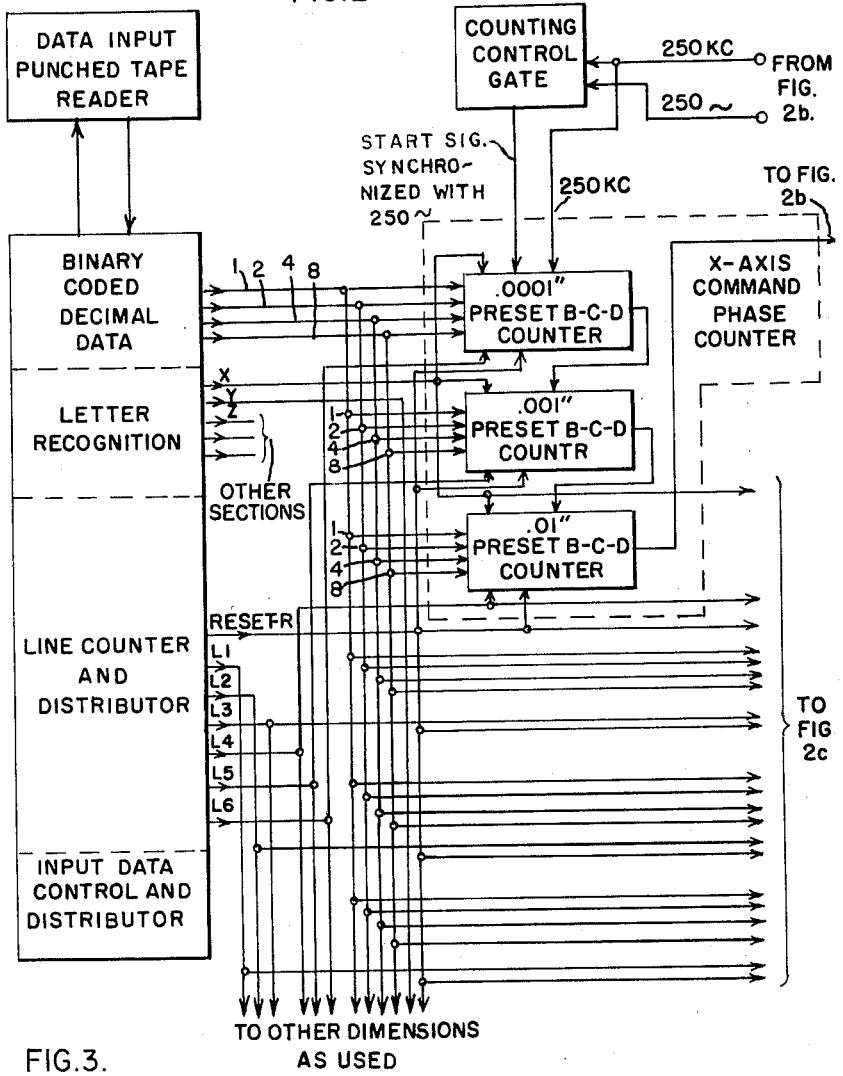
Figure 2B:
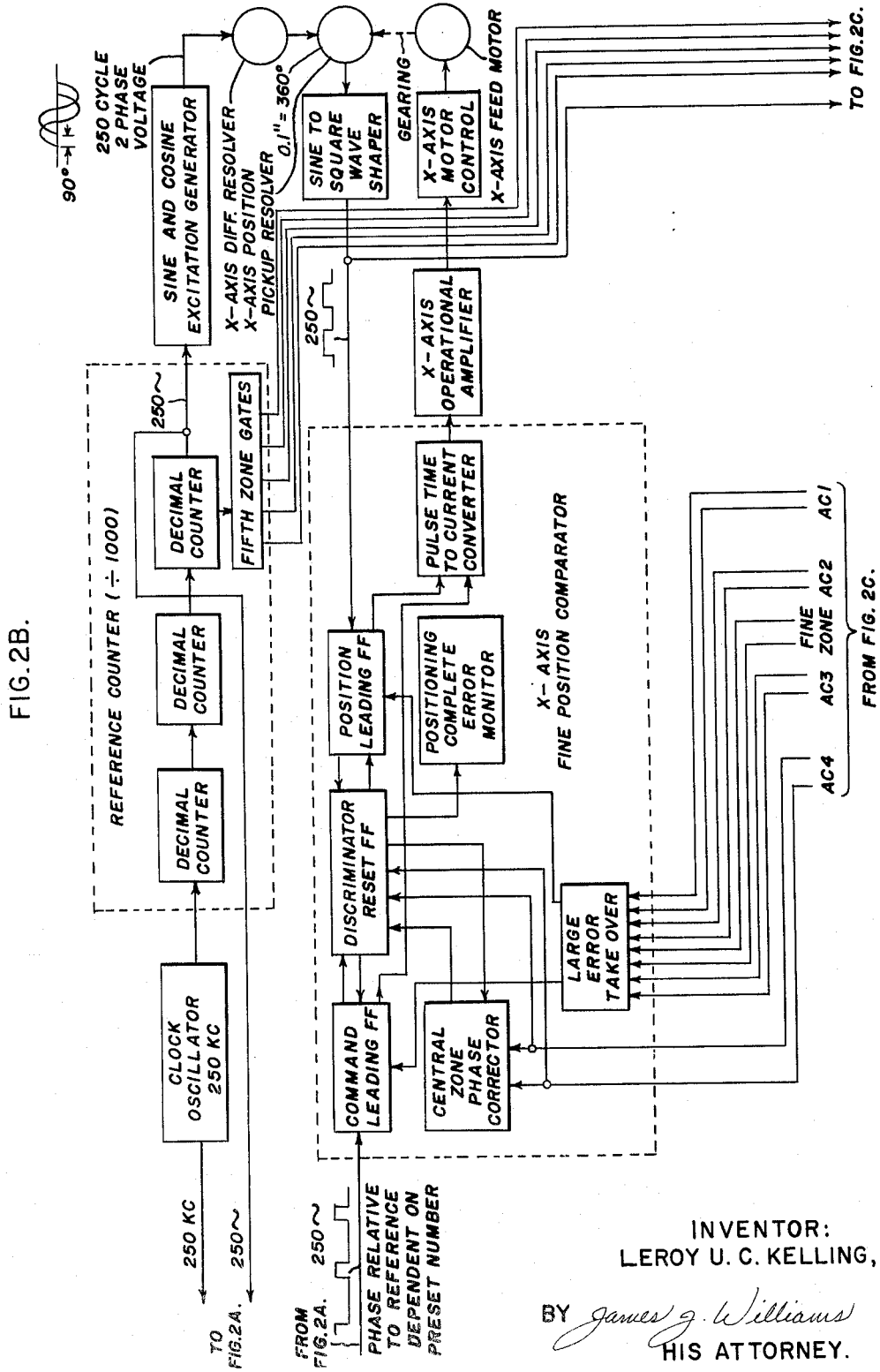

FIGURES 2a, 2b, and 2c show a comprehensive block diagram of a position control system utilizing my invention. In the interests of clarity, FIGURES 2a, b, and c show the system for positioning in only one direction, this direction being arbitrarily designated the X axis. For positioning in other directions, essentially identical equipment would be provided. The position control system shown in FIGURES 2a, 2b, and 2c and the subsequent figures is intended to position at any point (to a resolution of 0.0001 inch) over a 98.0000 inch range. A greater range can be attained with the position control system by the provision of additional decade equipment to be described. The position control system to be described provides a resolution of 0.0001 inch, but less resolution and/or greater range may be provided. This is substantially a matter of choice or selection. With reference to FIGURE 2a, information representing the desired position in actual dimensions with respect to a reference is supplied from a tape or similar device which is fed into an appropriate reading device. Such a tape may express decimal information in a binary coded form comprising four rows having the weight or significance of one, two, four and eight respectively. Additional rows may be used for parity checking, tape feed instructions and alphabetical information. Thus, a mark or punched hole in the first row indicates the number 1, a mark or hole in the second row indicates the number 2, a mark or hole in the third row indicates the number 4, and a mark or hole in the fourth row indicates the number 8. As examples, the decimal number 6 would be represented by marks or holes in the second and third rows; the decimal number 9 would be represented by marks or holes in the first and fourth rows; but the decimal number or 0 would be represented by marks or holes in none of these rows, but a mark or hole in some other row. Tape information can indicate a commanded position, or a commanded function, or an address for such a position or function. The following example will illustrate this: For a commanded position of 29.1865 inches along the X axis, the tape would first provide an X letter code providing the address information for the six digits of decimal data following. All subsequent information would then be routed to the X axis system. During the reading of the address code, the control generates a reset signal, which combined with the X address, resets the command units to zero state. During the reading of the first digit following the address, the tape would provide a line 1 address, which combined with the X address, inserts the first digit into the most significant digit of the X axis coarse command storage. This repeats for each less significant digit, and so on sequentially through a line 6 address for the command information for the least significant (ten-thousandths) digit. Specifically, the number 2 (in the tens decade) would be introduced by a line 1 address accompanied by the appropriate code of a mark or hole in the second row. The number 9 (in the units decade) would be introduced by a line 2 address accompanied by marks or holes in the first and fourth rows. Then, the number 1 (in the tenths decade) would be introduced by a line 3 address accompanied by a mark or hole in the first row. Then, the number 8 (in the hundredths decade) would be introduced by line 4 address accompanied by a mark or hole in the fourth row. Then, the number 6 (in the thousandths decade) would be introduced by a line 5 address accompanied by marks or holes in the second and third rows. And finally, the number 5 (in the ten-thousandths decade) would be introduced by a line 6 address accompanied by marks or holes in the first and third rows. All of this information is read and distributed by the reader and distributor blocks shown on the left of FIGURE 2a. The X dimension is supplied by the X bus (which goes to each of the X storages and counters), the commanded position digits are supplied in coded form by the 1, 2, 4, and 8 busses (which go to each of the storages and counters), the reset information is supplied by the reset bus R (which goes to each of the storages and counters), and the number addresses are respectively supplied by the busses L1 through L6 (which go to respective storages and counters). Such a code and its reading and distribution can be accomplished in a number of ways, all of which are well-known in the art and will not be described. The distributor block to the left of FIGURE 2a also shows provisions for other dimensions in the Y and Z directions, and shows that all of the information may be appropriately distributed to other systems for such other dimensions. Routing of the command numbers to the proper storage devices or counters is achieved by the line counter and distributor so that tens, ones, tenths and hundredths decade command numbers are routed to their respective command storages (in FIGURE 2c). The hundredths decade command number is also routed to and stored in the appropriate preset binary coded decimal counter included in the command phase counter block of FIGURE 2a. And finally, the thousandths and ten-thousandths decade command numbers are routed to and stored in their respective preset binary coded decimal counters also shown in the command phase counter block of FIGURE 2a. Each of the command storages shown in FIGURE 2c may comprise conventional storage devices of any suitable type, such as four flip-flops (corresponding to the numbers one, two, four, and eight respectively). Each flip-flop has two stable states or conditions and can thus indicate the presence or absence of its respective number. Likewise, each of the preset binary coded decimal counters shown in FIGURE 2a may comprise four conventional flip-flops similar to those used in the command storages. In addition, these preset binary coded decimal counters are connected together in tandem or chain fashion so that pulses applied to the 0.0001 inch counter are counted. The pulses applied to the 0.0001 inch counter are derived from the oscillator shown in FIGURE 2b, these pulses being at the 250 kilocycle rate. A control gate is provided so that the 0.0001 inch counter begins counting these pulses of the 250 kilocycle rate at the time the leading edge of a 250 cycle pulse is received. For each ten pulses so counted one pulse is applied to the 0.001 inch counter. For each ten pulses so counted, the 0.001 counter applies one pulse to the 0.01 inch counter which also counts the applied pulses and produces one output pulse for each ten pulses counted. This output pulse is applied to the fine position comparator system of FIGURE 2b where they are utilized for positioning as will be explained.

With particular reference to FIGURE 2b, there is shown an oscillator which produces base frequency signals, and a reference counter which, in effect, divides this base frequency into a lower frequency. Such an oscillator and a reference counter are known in the art, and may be provided by any of a number of known devices. The base frequency may be 250 kilocycles and the division may be one thousand, although other frequencies and divisions may be used. If the base frequency is 250 kilocycles and if the reference counter divides by one thousand, the lower frequency is then 250 cycles. The lower frequency signal from the reference counter may be a square wave. If so, this signal is applied to a sine and cosine excitation generator which converts the square wave into a sine wave, and then provides two 250 cycle sinusoidal waves having a relative phase of 90 degrees. These two waves may be considered sine and cosine waves. Waveforms illustrating these waves are shown in FIGURE 2b at the output of the excitation generator. These two waves are applied to a differential resolver, a device known in the art. The differential resolver is optional and may be used to permit the zero or reference point in its appropriate dimension (namely the X axis in this case) to be set or varied in accordance with particular working conditions. Such a differential resolver is desirable in cases where the desired zero or reference point of the numerical control program must be precisely positioned with respect to some point on a piece of work. Such precise positioning is difficult from an actual mechanical standpoint. The differential resolver permits the system to be adjusted electrically so that the work does, for all purposes, appear to be so precisely located. The output of the differential resolver is applied to the position pickup resolver. This resolver is also known in the art, and provides a single sinusoidal wave having a phase which varies in response to its rotational position from some reference rotational position. The position pickup resolver is mechanically rotated through gearing by the feed motor. The gearing may be arranged so that if the feed motor causes a machine element or tool to move 0.1000 inch, the position pickup resolver rotates precisely 360 degrees. The feed motor is driven in the appropriate direction to move the machine element or tool by a motor control which, in turn, is supplied with a signal from an operational amplifier. This signal is derived from the fine position comparator shown in FIGURE 2b.

The fine position comparator of FIGURE 2b provides an error signal having an appropriate polarity and magnitude which are functions of the direction and magnitude of the actual position relative to the commanded position. This error signal is supplied by a pulse time to current converter which is operated by a command leading flip-flop and a position leading flip-flop. These two flip-flops are normally in a zero state, and may be switched to the one state either by the application of signals from a large error takeover circuit or by signals from the command phase counter and the position pickup resolver sine to square wave shaper. When either of the two flip-flops is switched to the one state, the pulse time to current converter begins producing an output signal comprising pulses of current of constant magnitude but of a width varying directly with position error. These pulses are filtered to produce a D.C. error signal whose magnitude and direction determine the velocity and direction of rotation of the feed motor. The motor does not have to follow the on-off characteristics of the pulses from the current converter. Immediately after both the command leading flip-flop and the position leading flip-flop are switched to the one state, they are then switched back to the zero state by the reset flip-flop so that the command leading flip-flop and the position leading flip-flop are then receptive to new signals. The fine position comparator includes a large error takeover circuit which, for errors between the position and command counters in excess of a predetermined magnitude, provides the maximum error signal for the feed motor control. This large error takeover circuit responds sequentially to signals, beginning with the most significant, which are supplied by the coarse position comparator shown in FIGURE 2c. When all but the least significant analog comparator are unable to detect any difference in the command and position counters, the fine position comparator then becomes responsive to the time interval between the command phase counter signal and the resolver signal. The fine position comparator includes logic circuitry which is responsive to the least significant analog comparator to insure that the command and position leading flip-flops are receptive to the proper sequence of command phase counter and resolver signals in two bands adjacent to a central zone. The fine position comparator also includes a central zone phase corrector which insures that the command leading flip-flop and the position leading flip-flop are receptive to the proper sequence of command phase counter and resolver signals in the central zone. That is, the central zone phase corrector prevents the wrong flip-flop from being switched to the one state to provide an error signal in the wrong direction. Also, the fine position comparator includes a positioning complete error monitor which provides an indication that positioning is complete within a predetermined resolution or accuracy.

As mentioned, FIGURE 2c shows the coarse command storages for the tens, units, tenths, and hundredths decades. These storages are supplied with information from the tape reader and distributor of FIGURE 2a. FIGURE 2c also shows position feedback revolution counters which have the same corresponding decades, namely the tens, ones, tenths, and hundredths decades. The position counter for the hundredths decade is indicated by the block labeled fifth zone counter. The fifth zone counter is supplied with signals from the fifth zone gate shown in the reference counter of FIGURE 2b. Five signals from the gate are provided for one signal at 250 cycles from the reference counter. The fifth zone counter is also supplied with a square wave signal from the square wave shaper associated with the position pickup resolver. This square wave signal has a frequency of 250 cycles. The fifth zone counter recognizes which of five zones, each representing one-fifth of a complete revolution of the resolver, the square wave signal occurs in because of the gate signals applied thereto. The fifth zone counter provides an output signal indicative of the occurrence of the square wave signal in one of the zones. Hence the output signal from the fifth zone counter indicates the direction of positioning by the sequence of zones in which the square wave occurs. These output signals are applied to the tenth inch reversible counter which counts the signals and for each ten signals applied thereto produces one output signal. These output signals in turn are supplied to the one inch reversible counter which counts these signals and for each ten signals produces one output signal. The output signals from the one inch reversible counter are applied to the ten inch reversible counter which counts the signals applied thereto. The signals counted by each of the position counters and each of the command storages are actually represented by four flip-flops and their states. For example, if the one inch reversible counter has counted to seven, the first, second, and third-flip-flops of that counter are in the one state (representing one, two, and four respectively) while the fourth flip-flop (representing eight) is in the zero state. The respective flip-flops of each counter and of each storage are coupled to weighting resistors which, in effect, convert the condition of the flip-flops in their respective storages or counters to a voltage having an analog magnitude representative of the information in the storage or the counter. The weighting resistors for each corresponding storage and counter are coupled to a respective analog comparator. Thus, the weighting resistors of the ten inch storage and the ten inch counter are coupled to an analog comparator AC1, the weighting resistors of the one inch storage and one inch counter are coupled to an analog comparator AC2, and the weighting resistors of the tenth inch storage and tenth inch counter and the weighting resistors of the hundredths inch storage and hundredths inch counter are coupled to analog comparators AC3 and AC4. These analog comparators produce digital signals which indicate simply the differences (above a predetermined level) between the analog signals applied thereto and supply these digital signals to the large error takeover circuit and the fine position comparator shown in FIGURE 2b.

The coarse position comparator also includes correction circuits to insure that the system does not operate erroneously in response to a command which is very close in magnitude to a position. For example, if the control has positioned the machine element to a position of 20.0000 inches, and a new command of 19.9999 inches is given, the coarse comparator would see a difference of 1 (two compared to one) in the tens decade and would start positioning in response to what appears to be a large error. Actually, the machine need only move 0.0001 inch to provide the commanded position, hence some overshoot may occur. When a zero or one is compared with an eight or nine in the same decades, the correction circuits in the coarse position comparator effectively borrow one digit from the next higher or more significant decade and lend the borrowed digit, with appropriate decimal conversion, to the zero or one. In this way an apparent large digit by digit error is corrected or changed to what is actually only a small error. This borrowing continues down through the units decade. With borrowing in accordance with my invention, the example above would be changed as follows to a position of 19.1000 inches for comparison with a command of 19.9999 inches. Thus the ten and unit digits are the same, and in the tenths digit a value of 10 is compared with a value of 9. In the position as written, it should be clear how digits have been borrowed. The coarse position comparator also includes end zone correction circuits. As mentioned, the control in accordance with my invention is capable of positioning in a range spanning 98.0000 inches to an accuracy of 0.0001 inch. Most users prefer or like to be able to position at the 00.0000 inch point. This point is a point of discontinuity in the position counter because as the counter approaches a command of say 00.0001 inch from some higher previous position such as 10.0000 inches, it can pass beyond and hence through 00.0000 inch (as it may do either intentionally or unintentionally), so that it suddenly has a count of 99.9999 inches. Ordinarily this position as counted would make it appear that the machine must travel 99.9998 inches to reach the commanded position of 00.0001 inch. The end zone correction circuits shift the point of discontinuity to an 80.0000 inch command or position by assigning to numbers between 80.0000 and 99.9999 inches in the command and/or position counter a physical location in the region between 00.0000 and minus 20.0000 inches. The command for this region is a number 100 inches greater than the desired dimension. Thus minus 13.0000 inches requires an 87.0000 inch command.

The coarse position comparator also includes fine zone correction circuits. The fine zone correction circuit combined with analog comparator AC3 functions to define a region spanning 0.180 inch in width around the command point within which the fine position comparator functions in response to the time interval between the command phase counter and resolver signals. After positioning is within one inch of the commanded position, this combination compares the digital numbers of the 0.1 and 0.01 inch command with those of the 0.1 inch position counter and fifth zone counter to detect a predetermined difference. A logical comparison of the 0.1 inch digits in the command and position counters produce logical output signals which assist the coarse position comparator in effecting positioning to within the 0.180 inch region. Within this 0.180 inch region the fine position comparator provides final positioning by means of the time interval between the command phase counter and resolver signals.

Having given a brief description and comprehensive description of my position control system, I will describe each of the subsystems in the position control system in detail. Before doing so, however, I will give an explanation of the logic symbols used in my figures.

*Logic background*

Figure 3:
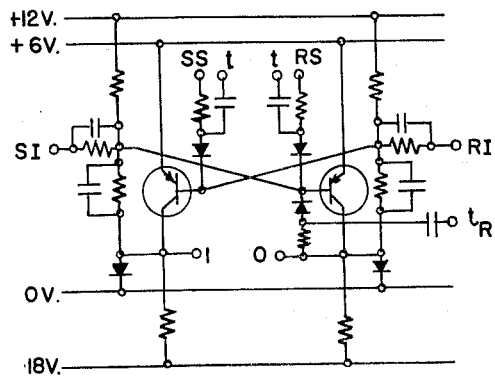
FIGURE 3 shows a diagram of a flip-flop used in my position control system.

As previously indicated, my invention utilizes digital and analog techniques to an improved advantage. The digital techniques employed in my invention include digital logic techniques based on known elements or building blocks. There are many publications describing such digital elements or building blocks, one such publication being a book entitled, "Design of Transistorized Circuits for Digital Computers," by A. I. Pressman, John F. Ryder Publisher, Inc, New York, 1960. The book referred to discloses a number of actual circuits for accomplishing the various logic functions including gates, flip-flops, and steered flip-flops. Persons skilled in the art will, after an explanation of the symbols shown in my figures, appreciate that a number of actual circuits may be utilized to provide the respective functions indicated by my symbols. Actually, I use only a limited number of logic devices. These include the steered flip-flops shown in the block form in FIGURE 4 as flip-flops FFA through FFE. These steered flip-flops are generally described in the book mentioned at pages 278 through 307, and a diagram of one of my flip-flops is shown in FIGURE 3. Outputs from the flip-flop shown in FIGURE 3, as well as in other figures, are taken from terminals 1 and 0. When the flip-flop is set, it is in the one state with the one terminal at a logic 1 and the zero terminal at a logic 0. When the flip-flop is reset, it is in the zero state with the one terminal at a logic 0 and the zero terminal at a logic 1. The flip-flops may be controlled by a number of inputs including a set steering input SS, a reset steering input RS, a set input SI, a reset input RI, set steering and reset steering trigger inputs $t$, and a reset trigger input $t_R$. A logic 1 at the set or reset inputs SI or RI sets or resets the flip-flop respectively for the duration of the logic 1, and subsequently if no further signals are applied to the flip-flop. A logic 0 at the set or reset steering inputs SS or RS for a predetermined time (immediately prior to a trigger pulse) permits the flip-flop to be set or reset by a trigger pulse change from logic 1 to logic 0 at the appropriate trigger input $t$. The flip-flop remains so set or reset after removal of these two signals and until further signals are applied to the flip-flop. And a trigger pulse change from logic 1 to logic 0 at the reset trigger input $t_R$ resets the flip-flop if it has the proper steering from its zero terminal. The locations of the outputs and inputs in the flip-flop diagram of FIGURE 3 have been generally followed in the flip-flop block diagrams in subsequent figures. Where there are omissions in the subsequent figures, such inputs or outputs were not needed in such cases.

At this point, it might be mentioned that throughout my specification, a logic 1 is represented by zero volts or by negative voltage while a logic 0 is represented by plus six volts. This is a matter of design and choice however.

Figure 6D:
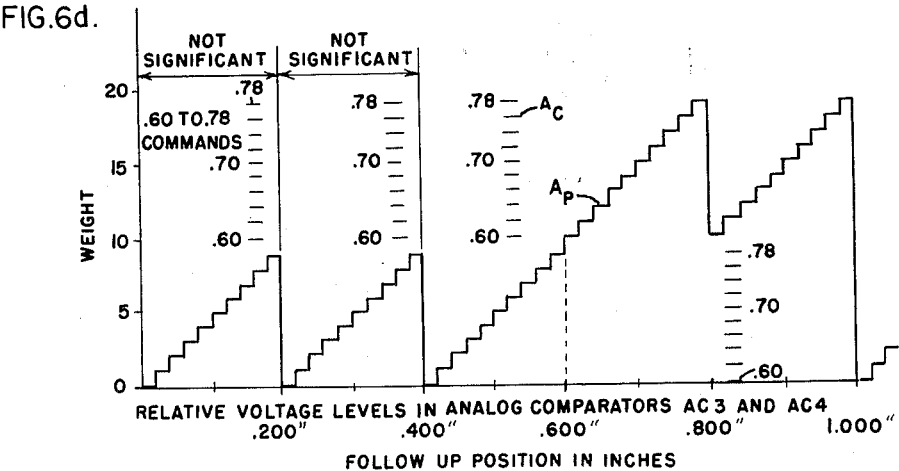
Figure 6E:
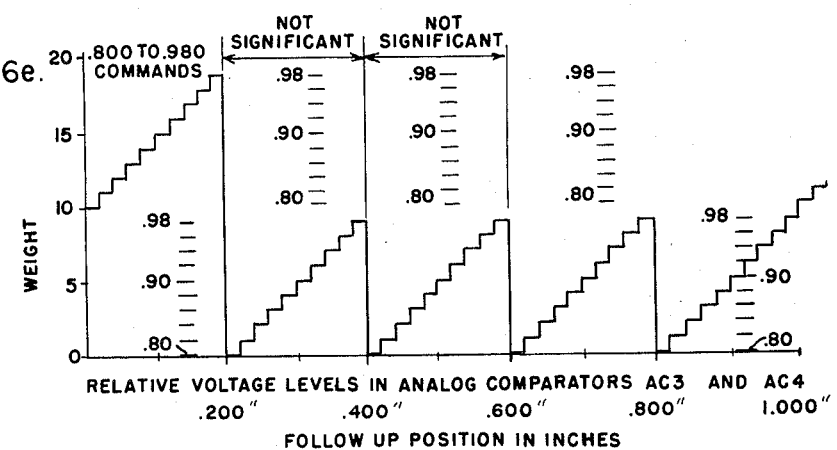
Figure 7B:
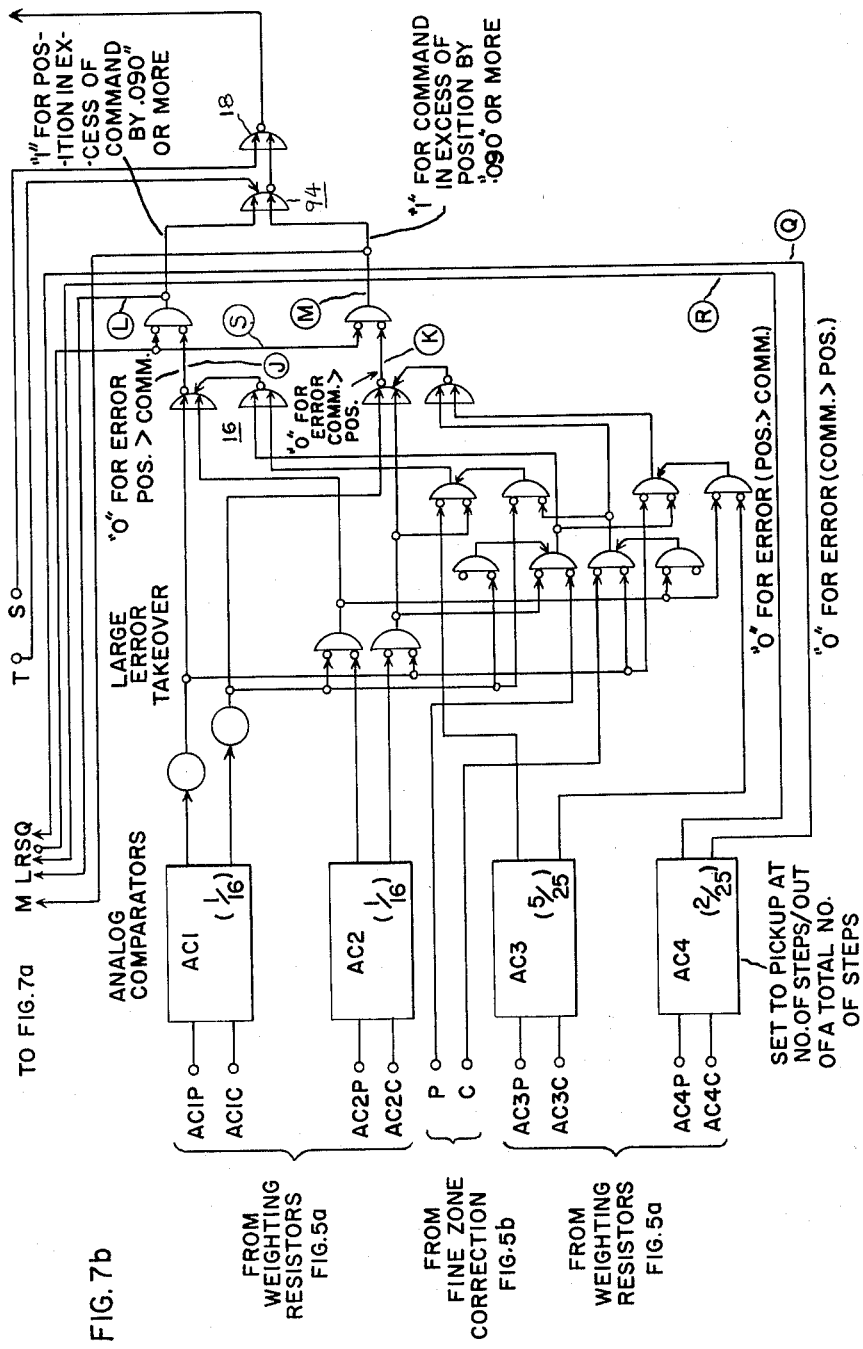

In my specification I also show a number of logic gates. Two examples of these logic gates are shown in FIGURE 4. The logic gate 10 represents, for the purposes of my application, a four input NOT AND gate (i.e., an AND gate with inversion at each of its inputs). This is sometimes called a NOR gate. In logic terms, the gate 10 produces a logic 0 at its output if any one of its four inputs are at a logic 1. Also in FIGURE 4, I show a similar logic gate 12 with two inputs. This gate 12 also produces a logic 0 at its output if either of its two inputs is at a logic 1. Also in FIGURE 4, I show inverters such as the inverter 14. The purpose of such an inverter is simply to reverse the logic of an applied signal. If a logic 1 is applied to the input of the inverter 14, a logic 0 is produced at its output, and if a logic 0 is applied to the input of the inverter 14, a logic 1 is produced at its output. Two other examples of the logic gates utilized in my control are shown in FIGURE 7b. The logic gate 16 represents, for the purposes of my application, a four input OR NOT gate (i.e., an OR gate with inversion at its output). This also is sometimes called a NOR gate. In logic terms, the gate 16 produces a logic 0 at its output if any one of its four inputs are at a logic 1. Also in FIGURE 6b, I show a similar logic gate 18 with two inputs. This gate 18 also produces a logic 0 at its output if either of its two inputs is at a logic 1. The operation of the various logic gates and inverters just described is explained in the book mentioned above, particularly at pages 114 through 144. The NOT AND and the OR NOT gates exemplified above are functionally and may be structurally the same. The symbols and designations used to explain these gates are given to assist persons in applying their AND and OR thinking to these NOR gates. And since such logic gates are known in the art, no further explanation need be given.

*Fifth zone counter*

My fifth zone counter shown in FIGURE 4 includes five steered flip-flops FFA, FFB, FFC, FFD, and FFE connected in a special form of ring counter. In normal operation, only one of the five flip-flops is in the one state at a time. The purpose of my fifth zone counter is to detect the occurrence of the leading edge of the square wave signals from the square wave shaper (and resolver) and to indicate in which zone, each representing one-fifth of a resolver revolution, this occurrence takes place. The square wave signals from the square wave shaper are derived from the position feedback resolver, this resolver producing waves of a frequency of approximately 250 cycles. As will be recalled by reference to FIGURE 2b, these 250 cycle signals are derived from the reference counter which divided the clock oscillator frequency of 250 kilocycles by 1000. Thus, each of the 250 cycle signals represents 1000 pulses or signals from the clock oscillator. The fifth zone counter divides the 250 cycle signal into five equal zones, each of which is therefore equivalent to 200 signals or pulses at the clock oscillator frequency of 250 kilocycles. The five zones are derived from the fifth zone gates, each of which is a NOR gate having a number of inputs. The number of these inputs is determined by the necessary logic to make the gates responsive to one of five zones as counted by the last decimal counter of the reference counter. The logic required is respectively indicated by each of the fifth zone gates, and it will be appreciated that a set steering signal will be provided for each of the flip-flops in accordance with the count present in the last decade counter of the reference counter. For counts between from 0 to 199 the flip-flop FFA has set steering, for counts from 200 to 399 the flip-flop FFB has set steering, for counts from 400 to 599 the flip-flop FFC has set steering, for counts from 600 to 799 the flip-flop FFD has set steering, and for counts from 800 to 999 the flip-flop FFE has set steering. In addition, each of these steering gates has an input from its associated flip-flop to block set trigger pulses to a flip-flop which is already set in the one state. When any one of the 250 cycle pulses from the square wave shaper is applied to the trigger inputs $t$ of the five flip-flops, the particular flip-flop having set steering (during the time of occurrence of the pulse) will be set to the one state in response to this pulse. If already in the one state, it will remain there. When this flip-flop is set to the one state, it resets the adjacent flip-flop in the ring, which is in the one state, back to the zero state. This is accomplished by connections from the zero output of each flip-flop to the reset trigger inputs $t_R$ on each of the adjacent flip-flops. As the last decimal counter of the reference counter continues to count clock pulses, the fifth zone steering gates are provided with logic which in turn can provide set steering for each of the successive flip-flops FFA, FFB, FFC, FFD, and FFE in turn. Then, the steering gate pattern begins over starting with flip-flop FFA, and so on in that order. If flip-flop FFA is in the one state immediately prior to the time that flip-flop FFE is set to the one state, then a count-up gate signal from the zero output terminal of flip-flop FFA steers a count-up pulse generated at the zero output terminal of flip-flop FFE into the 0.1 inch counter to cause it to count up by one count, i.e., 0.1 inch. Conversely, if flip-flop FFE is in the one state immediately prior to the time that flip-flop FFA is set to the one state, then a count-down gate signal from the zero output terminal of flip-flop FFE steers a count-down pulse generated at the zero output terminal of flip-flop FFA into the 0.1 inch counter to cause it to count down by one count, i.e., 0.1 inch. The reversible counter requires a gate followed by a pulse so that it can count in the proper direction. The set steering signals are blocked for the flip-flop which is already in the one state.

If the actual position is moving up scale at a slow rate, then the phase of the square wave pulse derived from rotation of the position feedback resolver will slowly shift in time to correspond with the fifth zones C, B, A, E, D, C, B, etc., in that order. Only the first such signal in each zone will cause the corresponding flip-flop to go to the one state thereby changing the state of the counter. Assume that flip-flop FFC has just been set to the one state by a square wave pulse from the square wave shaper occurring when a gate signal is present at the flip-flop FFC. It will be recalled that each flip-flop provides itself with reset steering when it is set to the one state. After several square wave pulses the phase of the square wave pulses advances so that it sets flip-flop FFB which resets flip-flop FFC; a later square wave pulse sets flip-flop FFA which resets flip-flop FFB; a later square wave pulse sets flip-flop FFE which resets flip-flop FFA; and a later square wave pulse sets flip-flop FFD which resets flip-flop FFE. Thus, flip-flop FFA is set and reset followed by flip-flop FFE being set and reset. In this way, a count-up gate followed by a count-up pulse is produced and applied to the 0.1 inch reversible counter, this indicating that the resolver is moving in the up-scale direction. If the resolver is moving in the down-scale direction, the resolver signal (from the square wave shaper) shifts in time to correspond with the fifth zones A, B, C, D, E, A, B, etc., in that order. Thus flip-flop FFE is set and reset followed by flip-flop FFA being set and reset. This would produce the opposite or down-scale effect because a count-down gate followed by a count-down pulse would have been produced in that sequence. Thus, it will be seen that the fifth zone counter recognizes which of five equal zones the square wave pulses are received or occur in, and produce an appropriate up or down-scale indication in accordance with the order in which these zones receive such square wave pulses. These pulses are derived from the respective leads shown in FIGURE 4, and are applied to the 0.1 inch reversible decimal counter to cause that counter, and its successive decades, to count either up scale or down scale. It should be noted that it is necessary that the feedback resolver rotate no faster than that speed which permits at least one square wave pulse to occur in each zone represented by adjacent flip-flops. Thus, the square wave pulse must not be received so rapidly that the feedback signal will be in, for example, the zone that sets the flip-flop FFA on one cycle and then be in the zone that sets flip-flop FFC on the next cycle, thus completely skipping flip-flop FFB. From a practical standpoint, this limitation requires that the maximum speed not exceed 60 degrees of phase shift per cycle in one direction and 90 degrees of phase shift per cycle in the other direction.

Instead of five zones, three, four, ten, or others could be used. Generally, less zones results in less resolution into coarser increments while more zones results in more resolution into finer increments. Five zones or ten zones are particularly suited to decimal operation.

*Coarse position comparator*

The coarse position comparator enclosed in the dashed lines of FIGURE 2c is shown in detail in FIGURES 5a and b. Briefly, the coarse position comparator compares, in analog fashion, the respective groups or decades of the command storages with the groups or decades of the decimal counters of the position feedback revolution counters. The coarse position comparator supplies digital signals indicative of this comparison to the large error takeover circuit in the fine position comparator. The large error takeover circuit contains logic circuitry which is receptive to or considers the most significant analog comparison, namely the comparison provided by the tens decade analog comparator AC1, and then is successively receptive to the analog comparison of the units decade analog comparator AC2, then to the fine zone correction circuit, and finally to the hundredths decade analog comparator AC3. It is desirable that the control position a machine tool or element at the 00.0000 inch reference point. Since this occurs at the discontinuity point or roll-over edge of a straight decimal counter, a means has been invented for shifting the range by 20 units to put the roll-over edge at minus 20 inches. Then, with suitable allowances for tolerances and overtravel, the control positions from minus 19.0000 inches to plus 79.0000 inches thus covering the 00.0000 inch position. This is accomplished in the end zone correction circuit shown in FIGURE 5a.

Generally, FIGURE 5a is arranged with the position or feedback portion in the upper half and the command portion in the lower half. And, it is symmetrically or correspondingly arranged with the most significant decade, namely the 10.0 inch decade on the right, followed on the left by the 1.0 inch decade, followed on the left by the fine zone correction circuit inputs (which includes the 0.1 inch inputs), and finally followed by the 0.01 inch decade on the extreme left. Each of the position and command decades respectively includes four binary coded decimal flip-flops having respective weights of 1, 2, 4, and 8. The 10.0 inch decade flip-flops for the position and command are respectively coupled to the four weighting resistors having magnitudes of 2.5K, 5K, 10K, and 20K as shown. Actually, these 2.5K weighting resistors are included only for total unit matching purposes, and are not actually utilized. In addition, a second 20K weighting resistor is included in both 10.0 inch decades for borrowing, these second 20K weighting resistors being respectively coupled to the correction circuits associated with the 1.0 inch decades. When a flip-flop is set or in the one state, its zero terminal is at logic 0 (plus six volts) and its one terminal is at logic 1 (zero volts). Thus a resistor connected to a terminal at logic 0 is energized and adds or contributes its units of weight. The resistors connected to the busses add, when so energized, units of voltage to the busses, these voltage units corresponding to the units of weight of the resistors. The position and command weighting resistors are connected to their common busses AC1P and AC1C respectively, these designations indicating that the busses are connected to analog comparator AC1 on the position side and to analog comparator AC1 on the command side. For the 10.0 inch decade, it will be seen that the five weighting resistors having values of 20K, 20K, 10K, 5K, and 2.5K may be considered as having weights or strengths inversely proportional to their resistance magnitudes. Thus, the borrowing 20K resistor, if energized, has a weight or magnitude of one unit, the second 20K resistor has the same weight of one unit, the 10K weighting resistor has a weight of two units, the 5K weighting resistor has a weight of four units, and the 1.5K weighting resistor has a weight of eight units. Thus, there is a total of 16 units which may be supplied by the weighting resistors in response to or in accordance with the state of the respective flip-flops and in response to the state of the borrowing resistor associated with the 1.0 inch decade. Theoretically, any number of units up to and including 16 may be applied to the bus AC1P or to the bus AC1C by appropriate energization of these weighting resistors. Although a potential total of 16 units of weight might be applied to the busses AC1P or AC1C, the eight units of the 2.5K resistor are never added so that the busses AC1P or AC1C will have from zero to eight units of weight in accordance with the borrow situation and the position and command. In the 1.0 inch position and command decades, the same arrangement as the 10.0 inch decade just described is used. However, these weighting resistors are coupled to the respective busses AC2P and AC2C. The left-hand 20K borrowing resistors for the 1.0 inch decade are coupled to leads which are labeled borrow 1P and borrow 1C, these leads being connected to the fine zone correction circuit of FIGURE 5b.

In the 0.1 and 0.01 inch position and command decades, the weighting resistors have magnitudes of 20K, 10K, 6.67K, 5K, 4K, and 2K. These weighting resistors have weights of one unit, two units, three units, four units, five units, and ten units respectively. In the 0.01 and 0.1 inch decades, each unit of weight on the busses AC3P, AC3C, AC4P, and AC4C is equivalent to 0.02 inch of command or position, since any one of the 0.01 inch command or position flip-flops is set to the one state for some multiple (including unity) of 0.02 inch. In the 0.01 inch position counter, the fifth zone counter flip-flops FFA through FFD are respectively coupled to weighting resistors having weights of four units, three units, two units, and one unit respectively. The other flip-flop FFE is not utilized in the weighting resistors. Thus, the fifth zone counter can add weights to the busses AC3P and AC4P in weights of no units, or one unit, or two units, or three units, or four units, each unit being equivalent to 0.02 inch. No combination of these units or weights is provided since only one of the fifth zone counter flip-flops is set to the one state at any one time. In the 0.01 inch command decade, only the two unit, four unit, and eight unit flip-flops are utilized with the weighting resistors, these flip-flops being respectively coupled to weighting resistors having weights of one unit, two units, and four units, each unit being equivalent to 0.02 inch. The one unit flip-flop in the 0.01 inch command decade is not utilized with the weighting resistors. Thus, for various combinations of the flip-flop states, weights of no units, one unit, two units, three units, or four units may be supplied to the busses AC3C and AC4C.

The minus 18 volt and 0 volt supplies are connected through a 1.8K resistor and diode rectifier respectively to the 6.67K resistors of the 0.01 inch command decade and the 2.5K resistors of the 10.0 inch command and storage decades in a manner that does not energize these resistors. These resistors are provided only for total unit matching purposes and do not add any weight in the circuits at any time.

The 4K resistors connected to the busses AC3P, AC4P, AC3C, and AC4C are respectively connected to two terminals 4K which go to the fine zone correction circuit of FIGURE 5b. Likewise, the 2K resistors go to two terminals 2K which also are connected to the fine zone correction circuit of FIGURE 5b. These resistors are energized to add their respective weights in response to the one unit 0.1 inch flip-flops and in accordance with the operation of the fine zone correction circuit as will be described.

*Coarse position comparator—end zone correction and borrowing*

An end zone correction circuit is provided in the 10.0 inch position and command decades to change the 00.0000 to 100.0000 inch range to a minus 20.0000 to plus 80.0000 inch range. To allow for tolerances and overshooting, the practical working range must be limited to a somewhat smaller range of minus 19.0000 to plus 79.0000 inches. This is accomplished through logic circuitry which recognizes any condition in the 10.0 inch position and command decades in which there is a zero or one in either the position or command and an eight or nine in the other of the position or command. In the 10.0 inch command, this is accomplished by a four input NOR gate 30 and a two input NOR gate 32; and in the 10.0 inch position, this is accomplished by a four input NOR gate 34 and a two input NOR gate 36. The logic circuitry responds to the zero or one and the eight or nine condition mentioned, and when this condition is sensed, the logic circuitry energizes the appropriate or proper one of the 10K resistors. For example, assume that there is a one in the 10.0 inch command (10 inches) and a nine in the 10.0 inch position (90 inches). The 10.0 inch command flip-flop FFC10 will be in the one state and the flip-flops FFC20, FFC40, and FFC80 will all be in the zero state. In the 10.0 inch position, the flip-flops FFP10 and FFP80 will be in the one state. Each of the four inputs to the NOR gate 30 will be at a logic 0 and its output is therefore at a logic 1. This logic 1 is applied to the two input NOR gate 32 and this gate therefore produces a logic 0 at its output. Since a logic 0 represents a voltage of plus six volts, the 10K command resistor (representing a weight of two units) is energized. Therefore for the condition assumed in this example, an additional weight of two units is provided in the command. And since the 2.5K position resistor (representing a weight of eight units) is not energized, this weight of eight units is effectively deducted from the position. So if there were a position of 90 inches and a command of 10 inches, eight units or 80 inches would be taken away or deducted from the position, and two units or 20 inches would be added to the command. This change results in voltages on the analog comparator busses AC1P and AC1C corresponding respectively to a position of 10 inches and a command of 30 inches. What this correction actually does is to change the working range of the machine to minus 19.0000 inches to plus 79.0000 inches, and at the same time permit commands to span a total range of 98.0000 inches. Distances negative relative to 00.0000 inch are programmed as complements. Thus minus 4.5000 inches is commanded by a command of 95.5000 inches.

Another method of effecting the end zone correction to shift the range by 20 inches is to eliminate gates 30, 32, 34, and 36 and respectively connect the present 10K resistors to the zero outputs of the 20 unit flip-flops and respectively connect new 10K resistors to the one outputs of the 80 unit flip-flops while changing the 2.5K resistors to 3.33K resistors.

The same logic arrangement using four input NOR gates 38, 44 and two input NOR gates 40, 42, 46, 48 is utilized in the 1.0 inch position and command decade. The logic circuitry is responsive to the condition where there is a zero or one in either the position or command and an eight or nine in the other of the position or command. When this condition is sensed by the logic circuitry, it energizes the appropriate 10K weighting resistor (equivalent to a weight of two units) and the appropriate 2.5K weighting resistor (equivalent to a weight of eight units) to thereby add ten units of weight to the appropriate command or storage. The same logic circuitry also deenergizes the appropriate 20K borrowing resistor coupled to the 10.0 inch position or command decade to borrow a weight of one unit from the 10.0 inch decades to equalize the increase of ten units in the 1.0 inch decades.

The fine zone correction circuit has outputs which are applied to the coarse position comparator of FIGURE 5a through the terminals indicated. The input terminals Borrow 1P and Borrow 1C are connected to the 20K resistors (having a weight of one unit) of the 1.0 inch position and command decades. The input terminals 2K are connected to the 2K resistors (having weights of ten units) respectively associated with the busses AC3P, AC4P, AC3C, and AC4C. Likewise, the input terminals 4K are coupled to the 4K weighting resistors (having a weight of five units) which are coupled to the same busses. The operation of the fine zone correction circuit and its effect on these terminals will be discussed.

*Coarse position comparator—fine zone correction circuit*

In the design of my position control system, I considered the point at which control was to be shifted from the coarse position comparator (which produces maximum positioning speed) to the fine position comparator (which produces a positioning speed proportional to the actual distance from the commanded position). The upper limit of my fine position comparator is limited to one revolution of the feedback resolver which, through gearing, is equivalent to ±0.1 inch of motion. This means that my fine position comparator positions over a nominal range of 0.2 inch (actually 0.180 inch because the 0.01 inch decade is considered in increments of 0.02 inch). The lower limit of my coarse position comparator is limited to the system servo gain and maximum positioning speed. Between these two limits, a practical point at which control may be shifted from the coarse to the fine position comparator is when the actual position is at a nominal distance of ±0.1 inch from the commanded position. In order to accomplish this, the 0.1 inch comparator AC3 must actually compare both 0.1 and 0.01 inch position and command units of weight. If the comparator AC3 only compared the 0.1 inch position and command units, the coarse position comparator would, in certain situations, retain its maximum speed control even though the actual position were very close to the commanded position. This is exemplified by a position command situation of 16.3980 and 16.4000 inches. However, this comparison of two decades (0.1 and 0.01 inch) is not without problems. In the 0.1 inch decade, units of weight of 5, 10, 20, and 40 (for 0.1, 0.2, 0.4, and 0.8 inch steps respectively) would be required; and in the 0.01 inch decade (where it will be recalled only one step of the 0.02, 0.04, 0.06, or 0.08 inch steps is used), units of weight of 1, 2, 3, and 4 respectively would be required. Thus, the weighting resistors would have to provide a total of 85 discrete units of weight, and the comparator would have to compare as high as 49 units of weight for the number 0.98 inch. This number would mean that very precise weighting resistors are required along with the attendant matching and production problems, and that a comparator of appreciable precision is required. Therefore, I have provided the fine zone correction circuit which includes logic circuitry to consider the 0.1 and 0.01 inch positions and commands, make certain decisions on the basis of these positions and commands, and reduce the required number of units of weight for comparator AC3 to 25. This is a reasonable number and can be handled with relatively common components. In accordance with my invention, the fine zone correction circuit of FIGURE 5b eliminates the necessity for such a large number of precise resistors by means of logic circuitry which shifts the commands and positions, as reflected by the weights on the busses AC3P, AC4P, AC3C, and AC4C, up and down so as to provide the necessary number of unique or distinct combinations of command and position. These combinations are shown in the waveforms of FIGURES 6a, b, c, d, and e which illustrate all of the outputs from the busses AC3P, AC4P, AC3C, and AC4C for all possible positions and commands. The fine zone correction circuit of FIGURE 5b is supplied with appropriate logic in steps of two from the 0.1 inch command storages or flip-flops and the position counters or flip-flops. This logic is fed into a succession of NOR logic gates which ascertain or determine the relative position and command in the 0.1 inch decade, and provide the necessary logic at its outputs. The legends by the various gates in the fine zone correction circuit indicate the response of these gates in terms of the various flip-flops. Thus, the legend 0/8 by the upper left gate indicates that if the two, four, and eight unit flip-flops of the position counter are in the zero state and if the eight unit flip-flop of the command storage is in the one state, a logic 1 is provided at its output. A study of the fine zone correction circuit in FIGURE 5b and a study of the waveforms in FIGURES 6a, b, c, d, and e will show that there are many possible outputs from the fine zone correction circuit.

The outputs P and C (which are supplied to the large error takeover circuit) may both be a logic 1, or a logic 0 and a logic 1, or a logic 1 and a logic 0, but never both logic 0. The outputs labeled position 2K, command 2K, position 4K, and command 4K (which are supplied to the busses AC3P, AC4P, AC3C, and AC4C respectively) may have any possible combination of logic outputs between respectively similar outputs. The outputs labeled Borrow 1P and Borrow 1C may both be at logic 0, may be at logic 1 and logic 0, or may be at logic 0 and logic 1, but may not both be at logic 1. That is: there need be no borrowing; borrowing from either the position or command; but never borrowing from both position and command. The following examples will illustrate this, these examples being explained on the basis of the waveforms of FIGURES 6a, b, c, d, and e. In these figures, a region indicated as being "not significant" means that the outputs of the analog comparators AC3 and AC4 are not significant and that the outputs P and C (for the large error takeover circuit) have a significant output (either P or C is at logic 0), and therefore circuit operation depends upon the large error takeover circuit. In the other regions, that is those regions not having the "not significant" legend, the outputs P and C are both at a logic 1. Energization (namely a logic 0) of the 4K outputs of the fine zone correction circuit is indicated by position or command waveforms between the weights of five and ten, and between the weights of 15 and 20. Energization of the 2K outputs of the fine zone correction circuit is indicated by position or command waveforms between the weights of 10 and 20. And finally, the borrowing of 1P or 1C is indicated by the zero or one in either the 0.1 inch position or command and an eight or nine in the other of the 0.1 inch position or command.

A few examples may illustrate this more clearly. First, assume the example where the position is between 0.0000 and 0.1000 inch and the command is between 0.1000 and 0.1800 inch. The appropriate waveforms for this position and command are shown in FIGURE 6a, and the particular region involved is significant, and therefore the P and C outputs are both at logic 1. The position signal may, for the range specified, vary in weight between 0 and 5 units and the command signal may vary, for the range specified, in weight between 5 and 9 units. Thus, each of the 2K position and command outputs (each representing a weight of ten units) are both at a logic 1, and are therefore not energized. The 4K position output (representing a weight of five units) is not energized and is therefore at a logic 1. However, the 4K command output (also representing a weight of five units) is energized and is therefore at logic 0. There will be no borrowing because a 0-1 and an 8-9 situation is not present. Therefore, the Borrow 1P and Borrow 1C outputs are both at logic 0. As another example, assume a position of 0.9400 inch and a command of 0.6600 inch. The appropriate waveform is shown in FIGURE 6d, and in this specific region it will be seen that the waveforms are significant. The P and C outputs are therefore both at logic 1. The position signal has a weight of 17 units, which means that both the 2K position output and the 4K position output are energized (these representing a weight of 15 units). This energization means that these outputs are at logic 0. The command has a weight of three units, and therefore neither the 2K nor the 4K outputs are energized, so that they are at logic 1.

*Coarse position comparator—illustrative examples of operation*

To assist in understanding the operation of the coarse position comparator, I have selected several illustrative examples of position and command which will incorporate most, if not all, of the end zone correction features, the borrowing features, and the fine zone correction circuit features. These examples are set forth below:

of the fine zone correction circuit which goes to the large error takeover circuit has a logic of 1 on both the

|  | A | B | C | D |
|---|---|---|---|---|
|  | P-81.6421<br>C-19.7600 | P-31.7232<br>C-37.3100 | P-17.8321<br>C-17.5967 | P-29.9844<br>C-30.0566 |
| End Zone Correction | Yes | No | No | No. |
| If End Zone Correction Add 2 to | Command | Does not apply | Does not apply | Does not apply. |
| Borrow 1 from 10″ (P or C) | Position | No | No | Command. |
| Add 10 to 1″ (P or C) | do | No | No | Do. |
| Borrow 1 from 1″ (P or C) | No | No | No | Do. |
| Add 10 to 0.1″ (P and/or C) (2K resistors) | Yes/Yes | Yes/No | Yes/No | No/Yes. |
| Add 5 to 0.1″ (P and/or C) (4K resistors) | No/Yes | Yes/Yes | No/Yes | Yes/No. |
| Fine Zone P/C | 1/1 | 0/1 | 0/1 | 1/1. |
| Weights:[1] |  |  |  |  |
| AC1P | 0 | 4 | 2 | 3. |
| AC1C | 4 | 4 | 2 | 3. |
| AC2P | 12 | 2 | 8 | 10. |
| AC2C | 10 | 8 | 8 | 10. |
| AC3P | 12 | 16 | 11 | 9. |
| AC3C | 18 | 5 | 9 | 12. |
| AC4P | 12 | 16 | 11 | 9. |
| AC4C | 18 | 5 | 9 | 12. |
| Takeover Circuit Operative | Yes | Yes | Yes | No. |

[1] The comparators AC1, AC2, AC3, and AC4 are arranged to detect a difference in units of weight/out of a total number of units of weight respectively as follows: 1/16, 1/16, 5/25, and 2/25.

Example A assumes a position of 81.6421 inches and a command of 19.7600 inches. The control accepts the 81.6421 inch command as meaning minus 18.3579 inches from the 00.0000 inch reference position. In the 10.0 inch decade, the position and command calls for end zone correction, and this end zone correction is accomplished by adding two units (hence effectively 20 inches) to the command and by deducting eight units (hence 80 inches) from the position. The addition of the two units is accomplished through the 10.0 inch command 10K resistor which has a logic 0 applied to it. The deduction of the eight units is accomplished by the 10.0 inch position 2.5K resistor having a logic 1 applied to it. Thus, the 10.0 inch comparator AC1 is, in effect, comparing zero units in the 10.0 inch position decade with four units in the 10.0 inch command decade because one unit is borrowed from the position but no units are borrowed from the command. Therefore the control causes the machine to move up scale toward correspondence. In the 1.0 inch decade, a one in the position is compared with a nine in the command. A borrowing situation is present so that the one unit borrowed from the eight in the 10.0 inch position decade is loaned as 10 units to the one in the 1.0 inch position decade. This borrowing is accomplished by a logic 1 (zero volts) applied to the 20K (one unit) borrowing resistor in the 10.0 inch position decade, and this lending is accomplished by a logic 0 (plus six volts) applied to the 10K (two units) and 2.5K (eight units) resistors in the 1.0 inch position decade. In the 0.1 inch decade, there is no borrowing from the 1.0 inch decade for example A. At this point the fine zone correction circuit must be considered. If the logic for the 0.6 inch position and the logic for the 0.7 inch command is followed through in the fine zone correction circuit, it will be seen that both the 2K position and command weighting resistors have a logic 0 applied to them and hence are energized. Therefore their weights of 10 units each are added to the busses AC3P, AC3C, AC4P, and AC4C. In a similar manner, it will be seen that the 4K weighting resistors associated with the position are not energized while the 4K weighting resistors associated with the command are energized. Hence, the weight of five units is not added to the position busses AC3P and AC4P, but the weight of five units is added to the command busses AC3C and AC4C. It will be seen that there is no 0/8 or 8/0 condition present, hence both Borrow 1P and Borrow 1C are at logic 0 (the non-borrowing condition). And finally, it will be seen that the output P and C leads. Therefore, the fine zone correction circuit is not utilized. The actual weights applied to the various busses are also given, and it will be seen that each of the analog comparators is utilized at its appropriate point. Therefore, the takeover circuit is operative.

Example B assumes a position of 31.7231 inches and a command of 37.3100 inches. In this example, there is no end zone correction and there is no borrowing. However, in this example B a weight of 10 units is added through the 2K resistors to the position busses AC3P and AC4P, but is not added to the command busses AC3C and AC4C. The fine zone correction circuit is operative, since its output to the large error takeover circuit has a logic 0 for the position lead P and a logic 1 for the command lead C. The weights of the various busses are also given. Examples C and D are, in the light of the above explanation, generally believed self-explanatory. In example D at the 0.1 inch decade, there is an 8/0 situation present, but no 0/8 situation present. Hence Borrow 1C is at logic 1 (to borrow one unit of weight from the 1.0 inch command), and Borrow 1P is at logic 0 (non-borrowing condition). If there is a borrow situation present, the logic 1 at the output of either the 8/0 or 0/8 gates causes the NOR gates 50, 52 respectively to produce a logic 0 (plus six volts) at the 2K output. This logic 0 adds 10 units of weight (each unit being equivalent to 0.02 inch) to the respective busses AC3C, AC4C or AC3P, AC4P. The logic 1 at the output of either the 8/0 or 0/8 gates is also reflected into the P and C outputs for the large error takeover circuit.

At this point, FIGURES 6a, b, c, d, and e will be further explained in connection with the above examples. These figures show waveforms for various positions and commands having any tens and units of magnitude. Each of these waveforms shows the total weights applied to the weighting resistors associated with the position and command busses AC3P, AC4P, AC3C, and AC4C. These weights are scaled along the ordinate. The step-like waves represent positions as scaled along the abscissa. The vertical scales represent the command for each range of position. In Example A, which assumes a position of 81.6421 inches and a command of 19.7600 inches, FIGURE 6d is applicable. At the .6400 inch position on the abscissa, it will be seen that the position waveform has a weight of 12 units for this position. This is indicated by the legend $A_P$ (the first letter indicating the example given in the table above, and the second letter indicating P for position and C for command). This weight of 12 units is confirmed in the table above under Example A for the weights on the busses AC3P and AC4P. In this range, it will be seen that the command of 0.7600 inch has a weight of 18 units as indicated by the legend $A_C$. It will also be noted that in some areas of position, the position waveform extends up only through a weight of 9 units, or extends between a weight of 10 units and a weight of 19 units, or extends through a full weight of 19 units. This results from the addition of a weight of 10 units (by means of the 2K resistors) to both the position and the command, or to either the position or the command, or to neither the position nor the command. FIGURES 6a, b, c, d, and e illustrate the relative positions and commands for any given instant of relative position and command. In Example A, the position and command pointed out in FIGURE 6d are applicable only at the initial operation, and not for the remainder of the positioning. These relative positions and commands may change many times in accordance with the curves of this figure as the position changes successively over each inch of motion. However, once the positioning is within ±0.1 inch (a 0.2 inch range) of the commanded position, the analog comparison by the comparators AC3 and AC4 of the amplitude of the signal levels of FIGURES 6a, b, c, d, and e are applicable throughout the remainder of the positioning. In the particular example under discussion, namely Example A, both the position and command have had an additional 10 units of weight (added through the 2K resistors) added to them, and the command has also had an additional five units of weight (added through the 4K resistors) added to it. The examples assumed in the table above have been indicated on the appropriate waveforms in FIGURES 6a, b, c, d, and e. Thus, in Example B in FIGURE 6b, it will be seen that the command has a weight of five units (added by the 4K resistors), and the position has a weight of 16 units (added by the 2K, 4K and 20K resistors). However, it should be noted that this area is indicated as being not significant. The area indicated as being not significant means that the comparators AC3 and AC4 do not have any significance at this point, and hence the large error takeover circuit relies on the signals from the fine zone correction. Thus, with reference to FIGURE 6b and the table above, the fine zone correction circuit provides a position signal of logic 0 and a command signal of logic 1, and hence the fine zone correction is available. Actual coarse positioning, for this B example, is controlled by the output of the 1.0 inch comparator AC2 resulting from significant differences in the units digit. Example C is indicated in FIGURE 6c and it will be seen that the position has a weight of 11 units and the command has a weight of nine units. It will also be seen that the command has no additional weight through the 2K resistors, but does have additional weight through the 4K resistors. And, the position has additional weight of 10 units through the 2K resistors but does not have additional weight of five units through the 4K resistors. This also falls in a "not significant" region. Example D is illustrated in the waveforms in FIGURE 6a and is believed to be self-explanatory. Any combination of weighting resistors is possible from the logic of the fine zone correction circuit. In other words, there can be any combination of weights of 10 units (from the 2K resistors) for the position and command, and there can be any combination of weights of five units (from the 4K resistors) for the position and command. This can be verified by an examination of the waveforms in FIGURES 6a, b, c, d, and e as well as by assuming examples for the fine zone correction circuit of FIGURE 4b.

*Command phase counter*

Command numbers in the 0.01 inch, the 0.001 inch, and the 0.0001 inch decades are stored in the command phase counter. (The 0.01 inch command is also stored in the 0.01 inch command storage). This command phase counter includes binary coded decimal counters for each of the three decades. These counters may be 1, 2, 4, 8 unit flip-flops. These three decades provide a phase signal which is utilized by the pulse time discriminator of the fine position comparator. The preset binary coded decimal counters permit the three decades of command to be stored in these counters, and then to be utilized to provide the proper phase relationship between the command signal and the position resolver signal. The counters count the clock pulses at the 250 kilocycle rate, but they count these pulses at discrete times, specifically at the occurrence or leading edge of the 250 cycle signals from the reference counter. Thus, the command phase counter is synchronized with the 250 cycle reference signal so that the command phase counter starts counting the 250 kilocycle clock pulses at the occurrence or leading edge of a 250 cycle signal and thus produces, in the absence of any preset counting, an output signal (of 250 cycles) at the same time (and hence in phase with) the 250 cycle reference signal. In order to give recognition to a command in the hundredths, thousandths, and ten-thousandths inch decades, there must be a time-phase relationship between the command phase counter signal (hereinafter generally referred to as the command signal) and the phase of the reference signal. This is done by utilizing the command in these three decades to preset the three decades of binary coded decimal counters to correspond with this command. For example, if the command were 29.1375, the preset binary coded decimal counters would have a three stored in the 0.1 inch counter, a seven stored in the 0.001 inch counter, and a five stored in the 0.0001 inch counter. This, in effect, is the same as the three counters having counted 375 clock pulses of the 250 kilocycle rate. When the counting control gate applies a 250 cycle signal to start the binary coded decimal counters counting, they will, after receiving 625 clock pulses (1000 minus 375) produce an output command signal. It will be seen that this command signal occurs after only 625 clock pulses have been counted, and thus the command signal leads the reference signal by an amount representative of these 375 pulses. The command signals will continue to have this phase relationship with respect to the reference signals until a new command is given. The command signals are phase compared (after positioning is within a 0.180 inch range) with the position signals to provide control in accordance with this phase relation.

*Fine position comparator*

The fine position comparator shown in the dashed outline in FIGURE 2b is shown in detail in FIGURES 7a and 7b. The fine position comparator of FIGURE 2b includes a large error takeover circuit which is shown in FIGURE 7b; includes three flip-flops making up the pulse time discriminator, a central zone phase corrector, and a positioning complete error monitor which are shown in FIGURE 7a; and finally includes a pulse time to current converter which is shown in FIGURE 9 and will be described separately. With reference to FIGURE 7b, the large error takeover circuit includes logic circuitry which is supplied with signals from three of the analog comparators AC1, AC2 and AC3 and also from the fine zone correction circuit. Schematic diagrams of the analog comparators are not shown as they are known in the art. These comparators are intended merely to recognize or discriminate, within certain tolerances or limits, between a predetermined difference in units of weight from the appropriate position and command weighting resistors. The command and position busses connected to the comparators may swing in voltage between zero and six volts in discrete steps in accordance with the units of weight added by the weighting resistors.

If, in a comparator, the units of weight supplied by the command bus differ by at least a predetermined amount from the units of weight supplied by the position bus, the comparator provides a logic 1 and a logic 0 output. In FIGURE 7b, if the position exceeds the command, each analog comparator supplies a logic 0 at the upper output terminal and a logic 1 at the lower output terminal. If the command exceeds the position, then the upper terminal is at logic 1 and the lower terminal is at logic 0. If the difference between units of weight becomes smaller than the comparator is set to recognize, then both outputs of the comparator become a logic 1. The analog comparator AC1 associated with the 10.0 inch decade is set to recognize or discriminate between weight differences as small as one unit (out of a span of 16 units), and supply logic outputs indicative of a difference. The analog comparator AC2 associated with the 1.0 inch decade has the same characteristic. The analog comparator AC3 associated with the 0.1 and 0.01 inch decades is set to recognize weight differences of five units (out of a span of 25 units), and the analog comparator AC4 associated with the 0.1 and 0.01 inch decades is set to recognize weight differences of two units (out of a span of 25 units). The logic circuitry of the takeover circuit also receives a logic input from the fine zone correction circuit through the terminals labeled P and C. Output signals are derived from the large error takeover circuit at the leads labeled L and M which connect directly to the set input terminals SI of the position leading flip-flop FFPS and the command leading flip-flop FFCS respectively.

The large error takeover circuit utilizes a chain of command which responds to the most significant error decision from the comparators AC1, AC2, the fine zone correction circuit, and the comparator AC3, in this order of decreasing significance. The takeover circuit neglects all contrary error decisions of less significance. The large error takeover circuit controls the pulse time discriminator to cause that discriminator to provide maximum positioning speed in either direction depending on the actual and commanded positions. In the absence of an error signal input to the large error takeover circuit, this circuit surrenders control to the pulse time discriminator. The logic circuitry of the large error takeover circuit is arranged so that the outputs of the comparator associated with the most significant decade predominate and control the command and position leading flip-flops. If the most significant comparator is satisfied, then the logic circuitry looks to the next most significant comparator for an output signal. This procedure follows consecutively through the comparators AC1 and AC2, through the fine zone correction circuit, and finally through the comparator AC3. By this means, the large error takeover circuit controls the flip-flops until the position is within approximately ±0.0900 inch. This is the nominal ±0.1 inch distance mentioned earlier. Positioning in this nominal ±0.1 inch distance is accomplished by the pulse time discriminator. A distance of 0.1 inch is equivalent to 360 degrees of resolver rotation so that the pulse time discriminator can position in a nominal ±360 degrees. Actually, there is a range of 0.180 inch which includes the commanded position and within which the 0.1 inch comparator AC3 does not detect any change in difference between position and command. Since the commanded position is approximately centered (to within 0.02 inch) in this range of 0.180 inch, the 0.1 inch comparator AC3 and the large error takeover circuit position to within approximately ±0.090 inch. This agrees with the sensitivity of five steps (each of 0.02 inch) of the 0.1 inch comparator AC3 where if the comparator is on one step, it cannot sense any change to the adjacent four steps above or to the adjacent four steps below. This is a total of nine steps of 0.02 inch or 0.180 inch for the range.

After positioning within approximately ±0.0900 inch, signals from the analog comparator AC4 associated with the 0.1 and the 0.01 inch decades act to synchronize the flip-flops of the pulse time discriminator. These signals are derived on the leads R and Q as shown in FIGURE 7b, these leads R and Q connecting to logic circuitry shown in FIGURE 7a.

The pulse time discriminator of the fine position comparator of FIGURE 7a includes a command leading flip-flop FFCS, a position leading flip-flop FFPS, and a reset flip-flop FFS. These flip-flops may be similar to the flip-flops described in connection with the fifth zone counter, and no further description will be given. The flip-flops are connected together in such a manner through logic circuitry that at the beginning, all of the flip-flops are in the zero state. If will be recalled that when a flip-flop is in the zero state, its one terminal is at logic 0 and its zero terminal is at logic 1. The command leading flip-flop FFCS and the position leading flip-flop FFPS have their set steering terminals SS coupled to the one terminal so that when these two flip-flops are set to the zero state, they are provided with set steering. The command leading flip-flop FFCS and the position leading flip-flop FFPS are also provided with set input terminals SI which are respectively connected to the leads L and M. These set input terminals SI are predominant in their control of the flip-flop, so that if a logic 1 signal is applied to the set input terminals SI, the flip-flop is controlled by this input regardless of the signals which may be applied to the set steering terminals SS and the reset steering terminals RS. If either of the two flip-flops is provided with a set input signal it becomes set in the one state, or if provided with a set steering signal, it will, upon receipt of a command or position signal at its trigger input t, become set in the one state. When it is set in the one state, its zero terminal goes to a logic 0 and it provides itself with reset steering to its reset steering terminal RS. The zero terminals of both the command and position leading flip-flops FFCS and FFPS are coupled to respective two input NOR gates 70, 72. These gates 70, 72 are coupled through a two input NOR gate 74 to the set steering terminal SS of the reset flip-flop FFS. At this point in time, the reset flip-flop FFS is in the zero state so that its zero terminal has a logic 1 which, because of the inverter 76, applies a logic 0 to both gates 70, 72.

The following explains the operation of the pulse time discriminator operating solely in response to the command and position signals and in the absence of any restraint or guidance from the large error takeover circuit, or the synchronizing control of the 0.01 inch comparator AC4, or the central zone phase corrector: As soon as either the command leading flip-flops FFCS or the position leading flip-flops FFPS is set to the one state, its respective gate 70 or 72 applies a logic 1 to the gate 74 which, in turn, applies a logic 0 to the set steering terminal SS of the reset flip-flop FFS. Upon receipt of a clock pulse at its trigger terminal t, the reset flip-flop FFS is then set in the one state with its zero terminal at logic 0. Subsequently, the other of the position or command leading flip-flops is set to the one state by receipt of a signal at its trigger terminal t. The zero output of the two flip-flops are coupled to a two input NOR gate 78, and when both inputs to this gate 78 are at logic 0 (as they will be when both flip-flops FFCS and FFPS are in the one state), a logic 1 is produced at the output of the gate 78. This logic 1, when passed through a four input NOR gate 80, produces a logic 0 at the output of the gate 80. This logic 0, along with the logic 0 of the zero output terminal (at logic 0 at this time) of the reset flip-flop FFS are applied to a two input NOR gate 82 to produce a logic 1 at its output. This logic 1 is inverted by an inverter 84 to provide a logic 0 at the reset steering terminal RS of the reset flip-flop FFS. Upon receipt of the next clock pulse, the reset flip-flop FFS is reset to the zero state with its zero terminal at logic 1. This logic 1 is applied through the inverter 75 to the trigger terminal *t* of both flip-flops FFCS and FFPS to reset these flip-flops back to the zero state, since their reset steering terminals RS were previously steered with a logic 0. Thus, all flip-flops are returned to the reset condition or zero state. The circuitry just described will permit either the command leading flip-flop FFCS or the position leading flip-flop FFPS to be set to the one state first followed by the other flip-flop being set to the one state. After the two flip-flops have been set to the one state, they then reset flip-flop FFS to the zero state, and this in turn resets the command and position leading flip-flops FFCS and FFPS back to the zero state. This operation continues as long as appropriate signals are received. Outputs from the command and position leading flip-flops FFCS and FFPS are derived from the zero terminal and one terminal respectively and are utilized to provide a signal indicative of or responsive to the time interval between the two flip-flops FFCS and FFPS respectively going from the zero state to the one state. For example, with all the flip-flops in the reset or zero state, if a command signal is received, the command leading flip-flop FFCS is set to the one state and an output signal is derived from the command leading flip-flop FFCS to provide control. Subsequently, the position leading flip-flop FFPS is set to the one state and a similar signal is then derived. With both signals being derived, equal and opposite effects are produced resulting in no effective output. In this way an output is obtained only between the time the first of the flip-flops is set to the one state and the time the second of he flip-flops is set of the one state.

The following explains the operation of the pulse time discriminator operating in response to the large error takeover circuit and the synchronizing control of the 0.01 inch comparator AC4: As shown in FIGURE 7a, the fine position comparator is provided with a mode selection input. This mode selection input is arranged so that it is at logic 0 for contour control and so that it is at logic 1 for position control. Thus, for positioning, the lead S will be at a logic 0 because of the inverter 85, this lead S being utilized in several places in FIGURE 7a and FIGURE 7b. Lead S, along with lead R and lead Q are applied to two NOR gates 86, 88. These gates 86, 88 have two inputs. One input of the gate 86 is connected to the zero terminal of the command lead flip-flop FFCS and one input of the gate 88 is connected to the zero terminal of the position leading flip-flop FFPS. The other input of each of the gates is connected to two diode rectifiers, each of the diode rectifiers being poled so that the other input cannot receive any positive voltage. These other two inputs are receptive only to zero volts or a negative-going voltage. It will be recalled that a logic 0 is plus six volts, hence the lead S for position control has no effect on the gates 86, 88. Thus in positioning, the leads R and Q exercise respective sole control over these other inputs. Because leads L and M are connected to the set input terminals SI of the two flip-flops FFCS and FFPS, signals on the leads R and Q have no effect so long as set input signals are applied on these leads L and M. However, once positioning is within approximately ±0.0900 inch as mentioned, the leads L and M both become logic 0, and therefore do not provide the control at the set input terminals SI. When this condition takes place, the signals on the leads R and Q can then exercise a synchronizing control over the flip-flops FFCS and FFPS.

The synchronizing control provided by the 0.01 inch comparator AC4 operates in two bands which are inside the 0.180 inch range (outside of which control is by the large error takeover circuit). These two bands are each 0.060 inch, and when they are deducted from the 0.180 inch range a central zone of 0.060 inch is left. Control in this central zone is provided by the central zone phase corrector. The 0.060 inch bands result from the fact that the 0.01 inch comparator AC4 does not detect any change in difference between position and command less than 0.060 inch. This agrees with the sensitivity of two steps (each of 0.02 inch) of the 0.01 inch comparator AC4 where if the comparator is on one step, it cannot sense any change to the adjacent one step above or to the adjacent one step below. This is a total of three steps of 0.02 inch or 0.06 inch for the band. The synchronizing control insures that the proper command or position leading flip-flop is set for the actual conditions of the position and control signal. In other words, this control insures that if the position leads the command, the command leading flip-flop FFCS may not be set prior to the position leading flip-flop FFPS being set; or if the command leads the position, the position leading flip-flop FFPS may not be set prior to the command leading flip-flop FFCS being set. If the position exceeds the command, lead R is at logic 0 and lead Q is at logic 1. But if a command signal is erroneously received first, the command leading flip-flop FFCS is set to the one state and its zero terminal is at logic 0. The reset flip-flop FFS is then set to the one state. Thus, both inputs to the gate 86 are at logic 0 and its output is at logic 1. This logic 1 produces a logic 0 output at the output of gate 80 which, when coupled with the logic 0 applied by the reset flip-flop FFS, provides a logic 1 at the output of the gate 82, this being inverted to a logic 0 at the reset steering terminal RS. The discriminator reset flip-flop FFS to then reset to the zero state upon receipt of the next clock pulse and thus resets the command leading flip-flop FFCS. The next signal received must then be a position signal, and the logic circuitry including the gates 86, 88 will not cause the position leading flip-flop FFPS to be reset, but will allow it to be set, followed by the command leading flip-flop FFCS being set, this being followed by the rest of the proper operation already mentioned. If on the other hand the command exceeds the position, lead R is at logic 1 and lead Q is at logic 0. The gate 88 is then effective to supply a logic 1 to the gate 80 which in turn supplies a logic 0 to the gate 82 along with the logic 0 from the reset flip-flop FFS to cause resetting of the position leading flip-flop FFPS if it should be erroneously set first. In this way the proper sequence of operation is insured by the logic on the leads R and Q. Once the 0.01 inch comparator AC4 is satisfied, both leads R and Q are then at a logic 1. When these leads are at a logic 1, the central zone phase corrector circuit shown in FIGURE 7a is permitted to operate. In moving toward correspondence from a considerable distance, the above resynchronizing action will insure that the discriminator starts recognizing its two phase signal inputs in proper sequence thereby making further corrective action of the central zone phase corrector unnecessary. For each new command, no more than one resynchronizing action (furnished by action of either the analog-comparator AC4 or the central zone phase corrector) is required to correct any errors in the starting of the pulse time discriminator.

The central zone phase corrector is designed to resynchronize the pulse time discriminator under those conditions where the new command position is within approximately ±0.030 inch from the actual machine position in which condition the resynchronizing action of the signals from analog comparator AC4 is inoperative. Expressed in another way this is a band or zone of 0.060 inch containing both the actual position and the new commanded position. The central zone phase corrector includes a four input NOR gate 90. Two of its inputs are provided by the leads R and Q through respective inverters; one of its inputs is provided by the lead S, and the last of the inputs is provided by the zero output terminal of the central zone phase corrector flip-flop FFCZP. It will be recalled that lead S is at a logic 0 for positioning, and that leads R and Q are both at logic 1 when the 0.01 inch comparator AC4 can detect no further difference in units of weight. These logic 1's are inverted to logic 0's so that three of the inputs to the gate 90 are at logic 0. The fourth input may be either at a logic 1 or at a logic 0 depending on the state of the flip-flop FFCZP.

The central zone phase corrector operates on a timing principle. The central zone phase corrector is permitted to become effective only when positioning is within a central zone of 0.0600 inch. The actual position is within this central zone, and is no more than 0.0400 inch away from the commanded position. It will be recalled that at 250 cycles, one feedback pulse corresponds to a movement of 0.1000 inch. If this frequency is translated to time, it occupies a period of four milliseconds for each cycle, and thus four milliseconds correspond to 0.1000 inch of movement. Two milliseconds therefore correspond to 0.0500 inch of movement. If the positioning is within 0.0400 inch of the commanded position, a signal from either the command or position sources must be followed by a signal from the other of the command or position sources within some period less than two milliseconds. If such a second signal does not occur within two milliseconds, it signifies that the incorrect signal was received first. Therefore, the central zone phase corrector provides a timing circuit of two milliseconds which automatically resets the reset flip-flop FFS after it has been set in the one state by a command or position signal if the second and following signal (the other of the command or position) is not received within two milliseconds. Thus, the reset flip-flop FFS is reset so that the following signal is properly utilized. The central zone phase corrector includes a flip-flop FFCZP which, at the beginning of a cycle of operation, is in the zero state. This flip-flop FFCZP is in the zero state because the discriminator reset flip-flop FFS was previously reset to the zero state, and this provided a logic 0 (which after passing through an inverter 91) changed the logic 0 to a logic 1. This logic 1 is applied to the reset input terminal RI to reset the flip-flop FFCZP to the zero state. The central zone phase corrector also includes a timing flip-flop FFT which is started on its two milliseconds timing cycle when the discriminator reset flip-flop FFS is set to the one state by either a command or position signal followed by a clock pulse. The one terminal of the timing flip-flop FFT is normally at a logic 0, and goes to a logic 1 during its two milliseconds timing interval. At the end of this timing interval, the one terminal returns to a logic 0. When the reset flip-flop FFS is set to the one state, it also provides a logic 0 (because of the inverter 91) to one input of a two input NOR gate 92. The other input of the gate 92 is coupled to the one terminal of the flip-flop FFCZP which is at a logic 0 at this time. These two logic 0 inputs produce a logic 1 at the output of the gate 92 which is inverted to apply a logic 0 to the set steering terminal SS of the flip-flop FFCZP. When the two milliseconds timing cycle ends, the timing flip-flop FFT produces a logic 0 at its one terminal which is sharpened by two inverters and applied (as a logic 0) to the trigger terminal $t$ of the flip-flop FFCZP to set it to the one state. The zero terminal of the flip-flop FFCZP goes to a logic 0, and this along with the other inputs at the gate 90 provides a logic 1 at the output of gate 90. This logic 1 provides a logic 0 at the output of gate 80 which along with the logic 0 from the zero terminal of the reset flip-flop FFS provides a logic 1 at the output of gate 82. This logic 1 provides a logic 0 at the reset steering terminal RS of the reset flip-flop FFS. On the next clock pulse, the reset flip-flop FFS is reset to the zero state so that the pulse time discriminator is receptive again to command or position signals. If an improper signal had been received first, this resynchronizing action insures that the flip-flop FFS and the other circuitry will be receptive to the following proper signal. If the proper signal is received first, the second signal will be received in a period considerably less than two milliseconds, and the central zone phase corrector will not operate. Then a proper output will have been derived because both flip-flops FFCS and FFPS will have both been set to the one state in proper sequence followed by the discriminator reset flip-flop FFS then resetting all of the flip-flops to the zero state.

Also included in the fine position comparator is a positioning complete error monitor for positioning control operation. This error monitor operates in a similar manner to the central zone phase corrector and includes a timing flip-flop FFT having a timing period of 80 microseconds which is initiated when the reset flip-flop FFS is set to the one state by a command or position signal followed by a clock pulse. In the paragraph above, it was shown that four milliseconds correspond to 0.1000 inch of movement. Therefore, 80 microseconds, which is one-fiftieth of four milliseconds, correspond to 0.0020 inch of movement. The error monitor also includes a positioning complete flip-flop FFPC and an error monitoring flip-flop FFEM. These flip-flops FFPC and FFEM were, until positioning was within the central zone of 0.0600 inch, held in the reset state by a logic 1 applied to their respective reset input terminals RI. This logic 1 was provided by the gate 18 shown in FIGURE 7b. One input to the gate 18 is provided by lead S which, for positioning, is always at logic 0. The other input for gate 18 is provided from a four input NOR gate 94 (half shown in FIGURE 7a and half shown in FIGURE 7b). The four inputs to the gate 94 are provided by leads L and M (without inversion) and R and Q (after inversion). As will be recalled, if the large error takeover circuit is satisfied, leads L and M are both at logic 0. If positioning is within the range covered by the 0.01 inch comparator AC4, leads R and Q are at logic 1. The signals on leads R and Q are inverted before being applied to the gate 94 so that all inputs to the gate 94 will, after positioning is within the central zone, be at logic 0. Therefore, it applies a logic 1 to the gate 18. The gate 18 thus produces a logic 0 0.002 inch of the commanded position, the reset flip-flops FFPC and FFEM may be set. However, up until this condition takes place, the flip-flops FFPC and FFEM are held in the reset state. If the actual position is within 0.002 inch of the commanded position, the rest flip-flop FFS will be set to the one state and reset back to the zero state in response to position and command signals before the 80 microseconds timing period of the timing flip-flop FFT has expired. Under these conditions, the error monitor flip-flop FFPC is set to the one state, and cannot be reset to the zero state unless the 80 microseconds timing period ends before the reset flip-flop FFS returns to the zero state. The error monitor flip-flop FFEM is then set to the one state in response to the positioning complete flip-flop FFPC being set to the one state, and this state of the error monitor flip-flop FFEM may be utilized for any purpose desired such as making the control receptive to a new command, or permitting the machine to perform some operation at the attained position.

This operation is explained further in detail as follows: With the position complete flip-flop FFPC and the error monitor flip-flop FFEM in the zero state, the position complete flip-flop FFPC provides itself with set steering. When the reset flip-flop FFS is set to the one state, a logic 0 is provided by the inverter 91 to the trigger terminal $t$ to set the flip-flop FFPC to the one state. A logic 1 is applied to the input of the timing flip-flop FFT to start that flip-flop on the 80 microseconds timing period, and during this timing period the one terminal is at a logic 1. During the time that this one terminal is at logic 1, a logic 1 is applied to the gate 96 so that the inverter 98 supplies a logic 1 to the reset steering terminal RS of the position complete flip-flop FFPC. There is then no steering on this flip-flop FFPC. Therefore, if the reset flip-flop FFS is reset to the zero state (as by the complete sequence of command and position signals), no change takes place in the position complete flip-flop FFPC. On the next cycle when the reset flip-flop FFS is set to the one state, a logic 0 is applied through the inverter 91 to the trigger terminal

*t* of the error monitor flip-flop FFEM. This flip-flop FFEM is provided with set steering by the position complete flip-flop FFPC so that it too is set to the one state and provides an output which can be utilized as previously indicated. If, however, the 80 microseconds timing period ends before the reset flip-flop FFS is reset to the zero state, the gate 96 then has a logic 0 applied to both inputs, and a logic 1 is applied to the inverter 98. This logic 1 appears as a logic 0 on the reset steering terminal RS so that when the reset flip-flop FFS does become reset, a logic 0 is applied to the trigger terminal *t* to reset the flip-flop FFPC. On the next cycle the reset flip-flop FFS is again set to the one state, generating a trigger signal for simultaneously setting flip-flop FFEM to the same state as flip-flop FFPC was in and setting FFPC back to the one state. For a small error in position, flip-flop FFPC will alternate between the one and zero states, and flip-flop FFEM will stay in the zero state. For an error in position less than 0.0020 inch, both flip-flops will remain in the one state.

*Fine position comparator—illustrative example of operation*

The following example will illustrate the operation of the fine position comparator. Assume that the commanded position is, as in the case of Example D in the preceding table, 30.0566 inches. However, first assume that the position is at 15.9844 inches so that the command exceeds the position by an amount sufficient to require the large error takeover circuit to function, and to utilize 10.0 inch comparator AC1. Therefore, the lower output terminal of the comparator AC1 is at logic 0, and this is inverted to a logic 1 and applied to the four input gate supplying lead K. Lead K is therefore at logic 0, as is lead S for positioning, so that lead M is at logic 1. At this time, all inputs to the four input gate supplying lead J are at logic 0 so that lead J is at logic 1 and lead L is at logic 0. The logic circuitry of the large error takeover circuit precludes the conditions of the other comparators and the leads from the fine zone correction circuit from having any effect, and only the signal from the most significant comparator, in this case AC1, has effect. With lead M (coupled to the set input SI) at a logic 1, the command leading flip-flop FFCS is constantly held in the one state and its output provides the maximum signal to cause the position to move up scale toward the command. After the units of weight applied to the 10.0 inch comparator AC1 have a difference less than one, both outputs of the comparator AC1 become a logic 1. The 1.0 inch comparator AC2 then provides the controlling signal through its logic gates so that lead M is still at a logic 1. The same condition applies through the operation of the fine zone correction circuit, if operable, and through the 0.1 inch comparator AC3. Once the comparators AC1 and AC2, the fine zone correction circuit, and the comparator AC3 are satisfied, their outputs all become a logic 1. Leads J and K are therefore at a logic 1 and leads L and M are therefore at a logic 0. The command or position leading flip-flops FFCS and FFPS are then no longer held to the one state by these leads, and the fine comparator is permitted to function as a pulse time discriminator potentially subject to resynchronizing signals from the 0.01 inch comparator AC4 and the central zone corrector. As mentioned above, positioning within a range of approximately ±0.0900 inch is accomplished through the large error takeover circuit, after which positioning is accomplished by the pulse time discriminator. If positioning has been proper, the command still exceeds the position so that lead R is at logic 1 and lead Q is at logic 0. These leads and their logic insure that only the proper flip-flop is set first, in this case the command leading flip-flop FFCS is set first. If the position leading flip-flop FFPS should be set to the one state first, the presence of a logic 0 on the lead Q will immediately cause the reset flip-flop FFS to be reset to the zero state and thus reset the position leading flip-flop FFPS. Then the pulse time discriminator is again receptive to the next signal, which properly should and will be a command signal to set the command leading flip-flop FFCS to the one state. The pulse time discriminator continues to put out the proper error signal to continue positioning until the commanded position is reached. Within the central zone of 0.0600 inch, the central zone phase corrector can correct for errors in phase recognition, but such synchronizing action is not required after the pulse time discriminator has once attained proper pulse sequence recognition for a given command. When the pulse discriminator is started on a new command within the central zone of 0.0600 inch, an error in pulse sequence recognition is corrected by a single operation of the central zone phase corrector and positioning thus continues on to within the limits of the control and the over-all system. As the actual position approaches the commanded position, the phase of the position signal approaches coincidence with the phase of the command (phase counter) signal. When the position is within 0.0020 inch, the positioning complete signal is given. Actually, positioning may continue on to within a closer position than 0.0020 inch, but this indication is given for whatever purpose may be desired. The band of position, for which the positioning complete signal is generated, can be readily adjusted to different magnitudes by changing the timing interval of the timing flip-flop FFT in the positioning complete error monitor.

This example, particularly in the region of the commanded position, can be better understood from FIGURE 8. In FIGURE 8, distance is plotted along the abscissa and error signal magnitude is represented by the ordinate. FIGURE 8 illustrates a waveform superimposed on the Example D commanded position of 30.0566 inches. With this commanded position, a central zone of 0.060 inch is established about the commanded position, this central zone being positioned relative to the commanded position so that at least 0.020 inch of the central zone is on each side of the commanded position. The two bands of 0.060 inch are established on both sides of the central zone. Thus, a total range of 0.180 inch is provided for positioning without the large error takeover circuit. The waveforms superimposed on the position scale also indicate the regions in which the various circuits are operative. The regions labeled L and M correspond to the regions of control provided by leads L and M from the large error takeover circuit. The regions labeled large error takeover are equal in error signal but opposite in direction or sign, and provide constant positioning speed. They end on either side of the commanded position and are separated by the 0.180 inch range mentioned previously. Proportional positioning is provided in this 0.180 inch range. The regions labeled Q and R correspond to the 0.060 inch bands of synchronizing control provided by leads Q and R and the 0.01 inch comparator AC4. The central zone corresponds to the 0.060 inch central zone control provided by the central zone phase corrector. In FIGURE 8, it will be noted that the waveform has steps or discontinuities. These steps result from the fact that the central zone covers 0.060 inch, and the two bands each cover 0.060 inch, a total of 0.180 inch (nine 0.020 inch segments). Control into and out of this odd number (nine) of segments is shifted between the pulse time discriminator when responsive to the time sequence of the command and position signals (and hence providing from 80 to 100% of the maximum error), and between the pulse time discriminator when responsive only to either the position or command signal because of the large error takeover circuit (and hence providing 100% of the maximum error). If the commanded position were 30.0500 inches, the two steps would be equal (i.e., both would result in a 90% to 100% transition). If the commanded position were 30.0400 inches, there would be no step on the right and the step on the left would be a maximum (i.e., would result in an 80% to 100% transition). If the commanded position were 30.0600 inches, there would be no step on the left and the step on the right would be a maximum (i.e., would result in an 80% to 100% transition). The steps will have other values between these limits such as for the commanded position of 30.0566 inches which is not at a 0.1000 inch point (or multiple) and which is not at a mid-point such as 0.1500 inch.

Pulse time to current converter

The description of the fine position comparator pointed out that the time at which one of the position or command flip-flops is set to the one state with respect to the time the other flip-flop is set to the one state determines the magnitude and direction of error signal. The outputs of the two flip-flops are derived from the zero terminal of the command leading flip-flop FFCS and from the one terminal of the position leading flip-flop FFPS. These two outputs are coupled to the pulse time to current converter of FIGURE 9. These two outputs are applied to respective base electrodes of two PNP transistors 100, 102. Each of the two transistors 100, 102 is connected between a plus 12 volt bus and a minus 18 volt bus as shown in similar resistor networks. The collectors of the transistors 100, 102 are respectively coupled through oppositely poled diodes 104, 106 which are connected to a current network including two 100K resistors and two diodes 108, 110. The current dividing network is connected between terminals having approximately plus 105 volts and minus 105 volts, the current network diodes 108, 110 being poled to support current flow in the normal direction. If the command leading and position leading flip-flops FFCS and FFPS are in their normal reset condition, the zero terminal of the command leading flip-flop FFCS is in the one state (zero volts) and the one terminal of the position leading flip-flop FFPS is in the zero state (plus six volts). Thus, the command transistor 100 is turned on so that its collector electrode is at approximately plus six volts, and the position transistor 102 is turned off so that its collector electrode is at approximately minus six volts. Thus, both collector diodes 104, 106 are biased in the forward directions, and no current flows into or out of the amplifier. Rather, current is diverted from the plus 105 volt terminal through the diode 106 to the minus 18 volt terminal and from the plus six volt terminal through the diode 104 to the minus 105 volt terminal. If a command signal is received first, the command leading flip-flop FFCS is set in the one state and its zero terminal is at logic 0 or plus six volts. This turns the command transistor 100 off so that its collector becomes negative and the command diode 104 is back biased. Current now flows out of the amplifier through the lower diode 110 to the minus 105 volt terminal. This current flow out of the amplifier produces one effect which can be utilized in the servo motor control to bring about the desired positioning, in this case up scale. Subsequently, the other flip-flop, in the example assumed the position leading flip-flop FFPS, is set to the one state so that its one terminal goes to a logic 1. This turns the position transistor 102 on and back biases the position diode 106 so that current then flows from the plus 105 volt terminal into the amplifier. These two currents into and out of the amplifier are substantially equal and opposite and therefore have no effect. However, in the example assumed, when the command leading flip-flop FFCS was first set, the current flowing out of the amplifier was utilized to position up scale. It will also be appreciated that if the position leading flip-flop FFPS had been set first, then current flowing into the amplifier would have been utilized to produce the opposite effect. This operation is explained by the waveforms of FIGURE 10 which shows examples where the command signal leads and where the position signal leads. In the curves for the command signal leading, the utilized or net current of the converter is in a positive direction, whereas in the waveforms where the position is leading, the utilized or net current of the converter is in a negative direction. It will also be seen from FIGURE 10 that when both flip-flops are set to the one state and before the reset flip-flop resets them to the zero state, there is no net output current. The outputs may be integrated or filtered to provide a smooth control signal.

Excess error detector

Although my control system as described is primarily intended for use in a position control system, I mentioned that certain portions of my system can be used in a contour control system. My fine position comparator may be used in a contour control system such as described and disclosed in my co-pending application filed September 5, 1961, and having Serial No. 136,420, now Patent No. 3,226,649. In such a contour control system, it is desired that the commanded position constantly change to produce the desired contouring, and that the position signal follow along within some predetermined distance behind the commanded signal. However, in this system, it is necessary or desirable that the distance between the commanded position and the actual position not exceed some predetermined magnitude. The excess error detector shown in FIGURE 11 is designed to maintain this difference at a predetermined level. The excess error detector includes an excess error flip-flop FFEE which is normally reset in the zero state. If the excess error flip-flop FFEE becomes set to the one state, this condition indicates that an excess error exists between the commanded position and the actual position. While various levels of error can be set, I have arbitrarily assumed in FIGURE 11 that the excess error between the commanded position and the actual position shall not exceed 0.0800 inch. It will be recalled that 0.100 inch of movement corresponds to 360 degrees. Consequently, 0.0800 inch corresponds to 288 degrees, an error limit which will be acceptable under many operating conditions. It will also be recalled that for each 1000 pulses at the 250 kilocycles frequency, a movement of 0.100 inch is provided. Thus, a movement or error of 0.0800 inch corresponds to 800 such pulses. This number of pulses is utilized to indicate the relative commanded and actual positions. If a command is received followed by more than 800 pulses before the position signal is received, too great a lag exists and the error detector should provide an indication. Similarly, if a position signal is received prior to more than 200 command pulses having been received, this indicates that the position leads the command by an excessive amount. These conditions are indicated in FIGURE 12 which shows the waveforms where the command exceeds the position by more than the error detector permits and which also shows the condition where the position leads the command by more than the error detector will permit. This detection is provided by logic circuitry including a two input NOR gate 120 whose output is coupled to the set steering terminal SS of the excess error flip-flop FFEE. The inputs to the gate 120 are provided from the output of a four input NOR gate 122 and from the output of a six input NOR gate 124. The inputs to the gate 122 are supplied by the zero terminal of the command leading flip-flop FFCS, the mode selection terminal, the $\overline{800}$ (i.e. not 800) terminal of the command phase counter, and the one terminal of the excess error flip-flop FFEE in that order from left to right. The inputs to the gate 124 are supplied by the one terminal of the command leading flip-flop FFCS, the 800 terminal of the command phase counter, the 400 terminal of the command phase counter, the one terminal of the excess error flip-flop FFEE, the 200 terminal of the command phase counter, and the mode selection input in that order from left to right. It will be recalled that for contouring, the mode selection provides a logic 0 for contouring. If the command signal leads the position signal, the command leading flip-flop FFCS, on being set, will provide a logic 1 at the gate 124 so that a logic 0 is produced at the output of the gate 124.

If 800 counts from the command phase counter have not been reached, a logic 1 is procduced by the $\overline{800}$ terminal and applied to the gate 122 so that a zero is produced at the output of this gate 122. With a logic 0 applied to both inputs of the gate 120, a logic 1 is applied to the set steering terminal SS and the flip-flop FFEE cannot be set by a trigger signal from the resolver. However, if 800 counts are received before the resolver position signal is received, all inputs to the gate 122 become logic 0 so that the output of gate 122 is at a logic 1. This causes the gate 120 to produce a logic 0 which, when applied to the set steering terminal SS, permits the flip-flop FFEE to be set to the one state when a resolver signal is received and thereby indicate excess error. The flip-flop FFEE can be reset, after appropriate action, by closing the reset button to supply zero volts (logic 1) to the reset input RI. If the position or resolver signal occurs first, it must, to be within the error limits, not occur before the command phase counter has counted up as high as 200. This will be apparent from the lower waveforms of FIGURE 12. If the command leading flip-flop FFCS is still in the zero state, a logic 1 is applied to the gate 122 and a logic 0 is produced at the output of the gate 122. The command leading flip-flop FFCS supplies a logic 0 to the gate 124. All of the other inputs to gate 124 will also be at a logic 0 so that a logic 1 is produced at the output of the gate 124. This logic 1 provides, through the gate 120, a logic 0 at the set steering terminal SS so that a signal from the resolver will set the flip-flop FFEE to indicate an error if it occurs during this time. However, once a count of 200 is reached by the command phase counter, one of the terminals 200, 400, or 800, will be at a logic 1 which produces a logic 0 at the output of the gate 124. This then results in the gate 120 having a logic 1 at its output so that no set steering is provided. If a signal from the resolver then occurs the excess error flip-flop FFEE will not be set.

Conclusion

It will thus be seen that my invention provides a new and improved position control system, this control system utilizing many advantages of digital and logic techniques. In particular, my coarse position comparator and my fine position comparator utilize these techniques to provide improved positioning and further to provide an improved transition between the coarse and fine comparators. Also, my comparators utilize techniques for certain positions and commands which shift the point of discontinuity at the 00.0000 inch point out of the working range and which borrow digits to prevent overshoot. And also, my fine position comparator is able to discriminate over ±360 degrees of operation of the position feedback device. While my invention has been described with reference to particular embodiments, it is to be understood that modifications may be made by persons skilled in the art without departing from the spirit of the invention or from the scope of the claims.

What I claim as new and desire to secure by Letters Patent of the United States is:

1. In a system for controlling the relative position of two objects wherein commanded position is digitally stored in a plurality of predetermined groups of registers of varying significance and actual position is digitally indicated in a plurality of corresponding predetermined groups of registers of varying significance, a comparison system comprising a plurality of digital-to-analog conversion devices each capable of producing an analog signal in response to an applied digital signal, means for coupling one of said conversion devices to each of said command position registers respectively, means for coupling one of said conversion devices to each of said actual position registers respectively, a plurality of analog comparators each having first and second inputs and an output for providing first and second digital signals, means for coupling said inputs of one of said comparators to each of the corresponding ones of said commanded position and actual position conversion devices respectively, and means coupled to the output of the comparator associated with the register groups of least significance for generating an error signal, the magnitude of which is proportional to the difference between the commanded position and the actual position to provide an error signal suitable for proportional control.

2. In a system for controlling the relative position of two objects wherein commanded position is digitally stored in a plurality of predetermined groups of registers of different numerical significance and actual position is digitally indicated in a plurality of corresponding predetermined groups of registers of different numerical significance, a comparison system comprising a plurality of digital-to-analog conversion devices each including a plurality of weighting devices for producing an analog signal in response to an applied digital signal, means for coupling one of said conversion devices to each group of said commanded position registers, means for coupling one of said conversion devices to each group of said actual position registers respectively, a plurality of analog comparators each having first and second inputs and an output circuit; said output circuit comprising first and second conductors for providing first and second digital output signals, means for coupling said inputs of each of said comparators to the corresponding ones of said commanded position and actual position conversion devices respectively, and means coupled to said first and second conductors of the comparator associated with the register groups of least significance for generating an error signal, the magnitude of which is proportional to the difference between the commanded position and the actual position to provide an error signal suitable for proportional control.

3. In a system for controlling the relative position of two objects wherein commanded position is digitally stored in a plurality of predetermined groups of registers of different decimal significance and actual position is digitally indicated in a plurality of corresponding predetermined groups of registers of different decimal significance, a comparison system comprising a plurality of digital-to-analog conversion devices, each of said conversion devices including a plurality of resistors of predetermined weights, said resistors being coupled at one end to a common bus and being coupled at the other end to the registers of an associated register group of said groups of registers, means for coupling one of said conversion devices to each group of said commanded position registers through said other end of said resistors, means for coupling one of said conversion devices to each of said actual position groups respectively through said other ends of said resistors, a plurality of analog comparators each having first and second inputs and an output circuit, said output circuit comprising first and second conductors for providing first and second digital output signals, means for coupling one of said inputs of each of said comparators to corresponding ones of said commanded position and actual position conversion devices respectively through said common busses, means coupled to said first and second conductors of the comparator associated with the register groups of least decimal significance for generating pulses, the width of which is proportional to the difference in time between said first and second conductors change from their normal signal condition to their other signal condition, and means responsive to said pulses for generating a current signal proportional in magnitude to the width of said pulses to provide an error signal suitable for proportional control when operating in the range of said least decimal significance.

4. In a system for controlling the relative position of two objects wherein commanded position is digitally stored in a plurality of predetermined groups of registers of different decimal significance and actual position is digitally indicated in a plurality of corresponding predetermined groups of registers of different decimal significance, a comparison system comprising a plurality of digital-to-analog conversion devices, each of said conversion devices including a plurality of resistors of predetermined weights, said resistors being coupled at one end to a common bus and being coupled at the other end to the registers of an associated register group of said groups of registers, means for coupling one of said conversion devices to each group of said commanded position registers through said other end of said resistors, means for coupling one of said conversion devices to each of said actual position groups respectively through said other ends of said resistors, said predetermined weights of said weighting resistors of said commanded position and said actual position groups having similar and corresponding weights respectively for corresponding groups, a plurality of analog comparators each having first and second inputs and an output circuit, said output circuit comprising first and second conductors for providing first and second digital output signals, means for coupling one of said inputs of each of said comparators to corresponding ones of said commanded position and actual position conversion devices respectively through said common busses, a bistable position storage element and a bistable command storage element connected to said first and second output conductors respectively, said storage elements assuming a first condition in response to the associated conductor assuming a given condition, and means responsive to the difference in time between the times when said storage elements assume said first condition for providing an error signal proportional in magnitude to said time difference.

5. In a system for controlling the relative position of two objects wherein actual position is indicated by a position signal and commanded position is indicated by a command signal, said position signal and said command signal having a relative phase which may be varied in accordance with a desired relative position, a comparison system comprising a command storage element having at least two stable conditions which can be controlled by inputs thereto, a position storage element having at least two stable conditions which can be controlled by inputs thereto, means for applying said command signal to one of said command storage element inputs to cause said command storage element to assume a first of said conditions in response to said command signal, means for applying said position signal to one of said position storage element inputs to cause said position storage element to assume a first of said conditions in response to said position signal, means coupled to both of said storage elements to cause both of said storage elements to assume a second of said conditions in response to both of said storage elements being in said first condition, and utilization means coupled to and responsive to the interval between the respective assumptions of said first conditions by said storage elements.

6. In a system for controlling the relative position of two objects wherein actual position is indicated by a position signal and commanded position is indicated by a command signal, said position signal and said command signal having a relative phase which may be varied in accordance with a desired relative position, a comparison system comprising a command storage element having at least two stable conditions which can be controlled by inputs thereto, a position storage element having at least two stable conditions which can be controlled by inputs thereto, means for applying said command signal to one of said command storage element inputs to cause said command storage element to assume a first of said conditions in response to said command signal, means for applying said position signal to one of said position storage element inputs to cause said position storage element to assume a first of said conditions in response to said position signal, a reset storage element having at least two stable conditions which can be controlled by inputs thereto, means coupling said reset storage element to both said command and said position storage elements so that said reset storage element assumes a first of said conditions in response to said command and said position storage elements both assuming said first condition and to that said command and said position storage elements assume a second of said conditions in response to said reset storage element being in said first condition, and utilization means coupled to and responsive to the interval between the respective assumptions of said first conditions by said command and said position storage elements.

7. The comparison system as defined in claim 6 and further including means for causing said command storage element to continuously assume said first condition in response to the commanded position exceeding the actual position by a predetermined magnitude and for causing said position storage element to continuously assume said first condition in response to said actual position exceeding said commanded position by a predetermined magnitude.

8. In a system for controlling the relative position of two objects wherein actual position is indicated by a position signal and commanded position is indicated by a command signal, said position signal and said command signal having a relative phase which may be varied in accordance with a desired relative position, a comparison system comprising a command storage element having at least two stable conditions which can be controlled by inputs thereto, a position storage element having at least two stable conditions which can be controlled by inputs thereto, a reset storage element having at least two stable conditions which can be controlled by inputs thereto, said two conditions of each of said three elements being respectively similar, means for applying said command signal to one of said command storage element inputs to cause said command storage element to assume a first of said conditions in response to said command signal, means for applying said position signal to one of said position storage element inputs to cause said position storage element to assume a first of said conditions in response to said position signal, means coupling said reset storage element to both said command and said position storage elements so that said reset storage element assumes a second of said conditions in response to said command and said position storage elements both assuming said first condition and so that said command and said position storage elements assume a second of said conditions subsequent to and in response to said reset storage element being in said second condition, and utilization means coupled to and responsive to the interval between the respective assumptions of said first conditions by said command and said position storage elements.

9. In a system for controlling the relative position of two objects wherein actual position is indicated by a position signal and commanded position is indicated by a command signal, said position signal and said command signal having a relative phase which may be varied in accordance with a desired relative position, a comparison system comprising a command storage element having at least two stable conditions which can be controlled by inputs thereto, a position storage element having at least two stable conditions which can be controlled by inputs thereto, a reset storage element having at least two stable conditions which can be controlled by inputs thereto, means for applying an external signal to said reset storage element, means for applying said command signal to one of said command storage element inputs to cause said command storage element to assume a first of said conditions in response to said command signal, means for applying said position signal to one of said position storage element inputs to cause said position storage element to assume a first of said conditions in response to said position signal, means coupling said reset storage element to both said command and said position storage elements so that said reset storage element assumes a first of said conditions in response to said command and said position storage elements both assuming said first condition and in response to said external signal, means coupling said command and said position storage elements to said reset storage element so that said command and said position storage elements assume a second of said conditions in response to said reset storage element being in said first condition, and means coupled to said command and said position storage elements for producing an output signal indicative of the interval between the respective assumptions of said first conditions by said command and said position storage elements.

10. In a system for controlling the relative position of two objects wherein actual position is indicated by a position signal and commanded position is indicated by a command signal, said position signal and said command signal having a relative phase which may be varied in accordance with a desired relative position, a comparison system comprising a command storage element having at least two stable conditions which can be controlled by inputs thereto; a position storage element having at least two stable conditions which can be controlled by inputs thereto; a reset storage element having at least two stable conditions which can be controlled by inputs thereto; means for applying said command signal to one of said command storage element inputs to cause said command storage element to assume a first of said conditions in response to said command signal; means for applying said position signal to one of said position storage element inputs to cause said position storage element to assume a first of said conditions in response to said position signal; means coupling said reset storage element to both said command and said position storage elements so that said reset storage element assumes a first of said conditions in response to either of said command and said position storage elements assuming said first condition, so that said reset storage element assumes a second of said conditions in response to said command storage element and said position storage element both assuming said first condition, and so that said command and said position storage elements assume a second of said conditions in response to said reset storage element being in said second condition; and utilization means coupled to and responsive to the interval between the respective assumption of said first conditions by said command and said position storage elements.

11. In a system for controlling the relative position of two objects wherein actual position is indicated by a position signal and commanded position is indicated by a command signal, said position signal and said command signal having a relative phase which may be varied in accordance with a desired relative position, a comparison system comprising a command storage element having at least two stable conditions which can be controlled by inputs thereto; a position storage element having at least two stable conditions which can be controlled by inputs thereto; a reset storage element having at least two stable conditions which can be controlled by inputs thereto; means for applying a recurring external signal to said reset storage element; means for applying said command signal to one of said command storage element inputs to cause said command storage element to assume a first of said conditions in response to said command signal; means for applying said position signal to one of said position storage element inputs to cause said position storage element to assume a first of said conditions in response to said position signal; means coupling said reset storage element to both said command and said position storage elements so that said reset storage element assumes a first of said conditions subsequent to and in response to either of said command and said position storage elements assuming said first condition and in response to said external signal, so that said reset storage element assumes a second of said conditions subsequent to and in response to said command storage element and said position storage element both assuming said first condition and in response to said external signal, and so that said command and said position storage elements assume a second of said conditions subsequent to and in response to said reset storage element being in said second condition; and utilization means coupled to and responsive to the interval between the respective assumption of said first conditions by said command and said position storage elements.

12. The comparison system as defined in claim 11 and further including means for causing said command storage element to continuously assume said first condition in response to the commanded position exceeding the actual position by a predetermined magnitude and for causing said position storage element to continuously assume said first condition in response to said actual position exceeding said commanded position by a predetermined magnitude.

13. In a system for controlling the relative position of two objects wherein actual position is indicated by a position signal and commanded position is indicated by a command signal, said position signal and said command signal having a relative phase which may be varied in accordance with a desired relative position, a comparison system comprising a command storage element having at least two stable conditions which can be controlled by inputs thereto, a position storage element having at least two stable conditions which can be controlled by inputs thereto, means for applying said command signal to one of said command storage element inputs to cause said command storage element to assume a first of said conditions in response to said command signal, means for applying said position signal to one of said position storage element inputs to cause said position storage element to assume a first of said conditions in response to said position signal, means coupled to said storage elements and having first and second outputs coupled to another of said command storage element inputs and to another of said position storage element inputs respectively for maintaining said storage elements in opposite conditions in response to the detection of a positional error greater than a predetermined amount so long as the positional error exceeds said predetermined amount so as to override the signals applied to said one inputs, and utilization means coupled to and responsive to the time interval between the respective assumptions of said first conditions by said storage elements for generating an error signal proportional in magnitude to said time interval.

14. In a system for controlling the relative position of two objects wherein actual position is indicated by a position signal and commanded position is indicated by a command signal, said position signal and said command signal having a relative phase which may be varied in accordance with a desired relative position, a comparison system comprising a command storage element having at least two stable conditions which can be controlled by inputs thereto, a position storage element having at least two stable conditions which can be controlled by inputs thereto, means for applying said command signal to one of said command storage element inputs to cause said command storage element to assume a first of said conditions in response to said command signal, means for applying said position signal to one of said position storage element inputs to cause said position storage element to assume a first of said conditions in response to said position signal, synchronizing means coupled to one of said inputs of both of said storage elements to cause one of said storage elements to assume a second of said conditions in response to said one storage element being in said first condition, and utilization means coupled to and responsive to the interval between the respective assumptions of said first conditions by said storage elements.

15. In a system for controlling the relative position of two objects wherein commanded position is digitally stored in a plurality of predetermined groups of varying significance and actual position is indicated by a feedback position signal that may vary in frequency, means for producing a fractional position signal from said feedback position signal comprising a plurality of storage elements each of which has two stable conditions that can be controlled by inputs thereto, means coupling said elements in a series so that any one of said elements causes both adjacent elements in said series to assume a second of said conditions in response to said one element being in a first of said conditions, means for cyclically enabling on a sequential basis said storage elements, means coupling said feedback position signal in common to all of said elements for causing the enabled storage element to assume said first condition in response to said feedback position signal, and output means coupled to two adjacent ones of said storage elements.

16. In a system for controlling the relative position of two objects wherein commanded position is digitally stored in a plurality of predetermined groups of varying significance and actual position is indicated by a feedback position signal that may vary in frequency, means for producing a fractional position signal from said feedback position signal comprising a plurality of storage elements each of which has two stable conditions that can be controlled by inputs thereto, means coupling said elements in a series so that any one of said elements causes both adjacent elements in said series to assume a second of said conditions in response to said one element being in a first of said conditions, means for cyclically enabling on a sequential basis said storage elements, means coupling said feedback position signal in common to all of said elements for causing the enabled storage element to assume said first condition in response to said feedback position signal, and output means coupled to two adjacent ones of said storage elements for indicating the order in which said two adjacent storage elements assume said first condition.

17. In a system for controlling the relative position of two objects wherein commanded position is digitally stored in a plurality of predetermined groups of varying significance and actual position is indicated by a feedback position signal that may vary in frequency, means for producing a signal that indicates the occurrence of said feedback position signal in N zones, where N is any integer, comprising N storage elements each of which has two stable conditions that can be controlled by inputs thereto, means coupling said elements in a series so that any one of said elements causes both adjacent elements in said series to assume a second of said conditions in response to said one element being in a first of said conditions, means for cyclically enabling on a sequential basis said storage elements, means coupling said feedback position signal in common to all of said elements for causing the storage element having said enabling signal to assume said first condition in response to said feedback position signal, and output means coupled to two adjacent ones of said storage elements for indicating the order in which said two adjacent storage elements assume said first conditions.

18. In a system for controlling the relative position of two objects wherein commanded position is digitally stored in a plurality of predetermined groups of varying significance and actual position is indicated by a feedback position signal that may vary in frequency, means for producing a signal that indicates the occurrence of said feedback position signal in any one of N zones, where N is any integer, comprising N storage elements each of which has two stable conditions that can be controlled by inputs thereto, means coupling said elements in a series so that any one of said elements causes both adjacent elements in said series to assume a second of said conditions in response to said one element being in a first of said conditions, means for cyclically enabling on a sequential basis said storage elements for sequentially providing said storage elements with an enabling signal, means coupling said feedback position signal in common to all of said elements for causing the storage element having said enabling signal to assume said first condition in response to said feedback position signal, and output means coupled to at least one of said storage elements for indicating which of said storage elements assumes said first condition.

19. In a system for controlling the relative position of two objects wherein actual position is indicated by the phase of a position signal with respect to a reference signal and commanded position is indicated by the phase of a command signal with reference to said reference signal, an error indicating system comprising a bistable storage element having first and second inputs and being responsive to the presence of said signals on both of said inputs for causing said storage element to switch from its normal condition to an operated condition to indicate an excessive error between said commanded position and said actual position, means for applying one of said signals to one of said storage element inputs, counting means having an output upon which appears said other signal, means for detecting a particular count in said counting means and in response thereto for generating a third signal, means for generating a fourth signal when said other signal coincides with said third signal, and means for applying said fourth signal to said other input so that if said one signal occurs after said counting means assumes said particular count condition said bistable storage element will assume its operated condition to indicate an excessive error.

20. In a system for controlling the relative position of two objects wherein actual position is indicated by the phase of a position signal with respect to a reference signal and commanded position is indicated by the phase of a command signal with reference to said reference signal, a timing indication system comprising a bistable storage element having first and second inputs and being responsive to the presence of signals on both of said inputs for causing said storage element to switch from its unoperated condition to an operated condition to indicate a predetermined relationship between said commanded position and said actual position, means for applying said position signal to one of said storage element inputs, counting means having an output upon which said command signal appears, means for detecting a particular count in said counting means and in response thereto for generating a third signal, means responsive to a particular phase relationship between said command and position signals for generating a fourth signal, and means responsive to coincidence of said third and fourth signals for applying a signal to said other input so that if said position signal occurs after said counting means assumes said particular count condition said bistable storage element will assume its operated condition to indicate said predetermined relationship.

References Cited by the Examiner

UNITED STATES PATENTS

| | | | |
|---|---|---|---|
| 2,885,613 | 5/1959 | Myracle et al. | 318—28 |
| 2,907,938 | 10/1959 | Hodgers et al. | 318—29 |
| 2,922,940 | 1/1960 | Mergler | 318—162 |
| 2,928,033 | 3/1960 | Abbott | 318—28 |
| 2,969,490 | 1/1961 | Anderson et al. | 318 162 |
| 3,015,806 | 1/1962 | Wang et al. | 318—162 X |
| 3,079,522 | 2/1963 | McGarrett | 318—162 |

JOHN F. COUCH, *Primary Examiner.*

ORIS L. RADER, *Examiner.*